(12) United States Patent
Kim et al.

(10) Patent No.: US 11,861,486 B2
(45) Date of Patent: Jan. 2, 2024

(54) NEURAL PROCESSING UNIT FOR BINARIZED NEURAL NETWORK

(71) Applicant: DEEPX CO., LTD., Seongnam-si (KR)

(72) Inventors: Lok Won Kim, Seongnam-si (KR); Quang Hieu Vo, Quang Binh province (VN)

(73) Assignee: DEEPX CO., LTD., Seonnam-si (KR)

( * ) Notice: Subject to any disclaimer, the term of this patent is extended or adjusted under 35 U.S.C. 154(b) by 9 days.

(21) Appl. No.: 17/985,257

(22) Filed: Nov. 11, 2022

(65) Prior Publication Data
US 2023/0082952 A1 Mar. 16, 2023

(30) Foreign Application Priority Data

Nov. 29, 2021 (KR) .................. 10-2021-0166866
Oct. 14, 2022 (KR) .................. 10-2022-0132254

(51) Int. Cl.
*G06N 3/063* (2023.01)

(52) U.S. Cl.
CPC .................................. *G06N 3/063* (2013.01)

(58) Field of Classification Search
CPC ...................................................... G06N 3/063
See application file for complete search history.

(56) References Cited

U.S. PATENT DOCUMENTS

| | | | | |
|---|---|---|---|---|
| 11,132,619 | B1* | 9/2021 | Casas | G06N 3/04 |
| 2019/0080231 | A1* | 3/2019 | Nestler | G11C 7/1006 |
| 2019/0244077 | A1* | 8/2019 | Franca-Neto | G06N 5/046 |
| 2020/0192631 | A1* | 6/2020 | Nemlekar | G06F 5/01 |
| 2020/0210759 | A1* | 7/2020 | Chou | G06N 5/04 |
| 2022/0121915 | A1* | 4/2022 | Wagle | G06N 3/063 |

OTHER PUBLICATIONS

Liang et al., "FP-BNN: Binarized Neural Network on FPGA," in 275 Neurocomputing 1072-86 (2018). (Year: 2018).*
Rastegari et al., "XNOR-Net: ImageNet Classification Using Binary Convolutional Neural Networks," in arXiv preprint arXiv: 1603.05279 (2016). (Year: 2016).*
Haruyoshi Yonekawa et al., "On-chip Memory Based Binarized Convolutional Deep Neural Network Applying Batch Normalization Free Technique on an FPGA", 2017 IEEE IPDPSW, Jun. 2, 2019.

* cited by examiner

Primary Examiner — Ryan C Vaughn
(74) Attorney, Agent, or Firm — Bridgeway IP Law Group, PLLC; Jihun Kim

(57) ABSTRACT

A neural processing unit of a binarized neural network (BNN) as a hardware accelerator is provided, for the purpose of reducing hardware resource demand and electricity consumption while maintaining acceptable output precision. The neural processing unit may include: a first block configured to perform convolution by using a binarized feature map with a binarized weight; and a second block configured to perform batch-normalization on an output of the first block. A register having a particular size may be disposed between the first block and the second block. Each of the first block and the second block may include one or more processing engines. The one or more processing engines may be connected in a form of pipeline.

16 Claims, 26 Drawing Sheets

FIG. 13

```
Loop1 : for iy = 0 to FRAME F-1 do
Loop2 :  for ix = 0 to FRAME E-1 do
Loop3 :   for oz = 0 to OUTPUT_CHANNEL-1 do
Loop4 :    for iz = 0 to OUTPUT_CHANNEL-1 do
Loop5 :     for ky = 0 to FILTER H-1 do
Loop6 :      for kx = 0 to FILTER W-1 do
              out_pixel [oz] [iy] [ix]
                  += in_pixel [iz] [iy+ky] [ix+kx]* weight [oz] [iz] [ky] [kx]
```

NEURAL PROCESSING UNIT FOR BINARIZED NEURAL NETWORK

CROSS-REFERENCE TO RELATED APPLICATIONS

This application claims the priority of Korean Patent Application No. 10-2021-0166866 filed on Nov. 29, 2021 and Korean Patent Application No. 10-2022-0132254 filed on Oct. 14, 2022, in the Korean Intellectual Property Office, the disclosure of which is incorporated herein by reference.

BACKGROUND OF THE DISCLOSURE

Technical Field

The present disclosure relates to artificial neural networks.

Background Art

Humans are equipped with intelligence that can perform recognition, classification, inference, prediction, and control/decision making. Artificial intelligence (AI) refers to artificially mimicking human intelligence.

The human brain is made up of numerous nerve cells called neurons. Each neuron is connected to hundreds to thousands of other neurons through connections called synapses. In order to imitate human intelligence, the modeling of the operating principle of biological neurons and the connection relationship between neurons is called an artificial neural network (ANN) model. That is, an ANN is a system that is implemented in either computer software, hardware, or both, and that connects computer implemented nodes that mimic neurons in a layer structure.

These artificial neural network models are divided into 'single-layer neural network' and 'multi-layer neural network' according to the number of layers therein. A typical multilayer neural network consists of an input layer, a hidden layer, and an output layer. (1) The input layer is a layer that receives external data (i.e., data external to the neural network), and the number of neurons in the input layer is the same as the number of input variables (i.e., each neuron in the input layer receives one input variable). (2) The hidden layer is located between the input layer and the output layer, receives a signal from the input layer, extracts characteristics, and transmits the extracted characteristics to the output layer. (3) The output layer receives the signal from the hidden layer and outputs it to the outside of the neural network. Within the hidden layer, the input signal between neurons is multiplied by each connection strength with a value between 0 and 1, and then summed.

Meanwhile, in order to implement higher artificial intelligence, an increase in the number of hidden layers of an artificial neural network is called a deep neural network (DNN). There are several types of DNNs, including convolutional neural networks (CNNs), which are known to be prone to extract features of input data and identify patterns of features.

Convolutional neural networks (CNNs) are neural networks that functions in a way similar to the image processing in the visual cortex of the human brain. Convolutional neural networks are known to be suitable for image processing.

However, since, due to the nature of a CNN, a very large amount of parameters, that is, floating point parameters, is required to extract features of input data, the demand for large memory of the computing system used for running the CNN is challenging and thus problematic. In order to solve this problem, a study on a low precision network that reduces the size of the input value or the parameter size of the layer of the neural network has been proposed and experimented.

As the result of the need and study of low precision networks, a binarized neural network (BNN) has been proposed.

However, existing studies approached BNN only theoretically, and could not and have not yield a hardware structure or electronic apparatus for actual implementation.

SUMMARY OF THE DISCLOSURE

Accordingly, an aspect of the present disclosure is to disclose a hardware architecture for implementing a BNN.

In particular, an aspect of the present disclosure is to present a streaming architecture for the BNN.

According to an example of the present disclosure, a neural processing unit for a binarized neural network (BNN) is provided. The neural processing unit may include: a first block configured to perform convolution by using a binarized feature map with a binarized weight; and a second block configured to perform batch-normalization on an output of the first block. A register having a particular size may be disposed between the first block and the second block. Each of the first block and the second block may include one or more processing engines. The one or more processing engines may be connected in a form of pipeline.

The first block or the second block may further include a line-buffer disposed between an input unit of the second block and an output unit of the first block.

The neural processing unit may further include a third block configured to perform max-pooling on an output of the second block.

The first block and the second block may correspond to a first layer of the BNN, and the third block may correspond to a second layer of the BNN.

The neural processing unit may further include a line-buffer or a memory configured to store a binarized parameter corresponding to a layer of the BNN.

A size of the line-buffer may be determined based on a size of a corresponding binarized feature map and a size of a corresponding binarized weight.

The first block may include a NOT logic gate or a XNOR logic gate.

The first block may be configured to select a NOT gate or bypass an input value based on the binarized weight.

The second block may be configured to perform the batch-normalization based on a threshold value.

The first block may further include a K-mean cluster unit.

The first block may further include a pop-count performing unit.

The pop-count performing unit may further include a compressor.

The first block may further include a pop-count reuse unit.

According to an example of the present disclosure, a neural processing unit for an artificial neural network (ANN) is provided. The neural processing unit may include: a plurality of blocks. The plurality of blocks may be connected in a form of pipeline. A number of the plurality of blocks may be identical to a number of layers of the ANN. A first block among the plurality of blocks may include a first sub-block configured to perform convolution by using a binarized feature map with a binarized weight; and a second sub-block configured to perform batch-normalization on an output of the first sub-block. A register having a particular size may be disposed between the first sub-block and the second sub-block. Each of the first sub-block and the second sub-block may include one or more processing engines.

The first sub-block or the second sub-block may further include a line-buffer disposed between an input unit and an output unit thereof.

The neural processing unit may further include a second block configured to perform max-pooling on an output of the second sub-block.

According to an example of the present disclosure, an electronic apparatus is provided. An electronic apparatus may include: a main memory; and a neural processing unit (NPU) configured for an artificial neural network (ANN). The NPU may include a plurality of blocks. The plurality of blocks may be connected in a form of pipeline. A number of the plurality of blocks may be identical to a number of layers of the ANN. A first block among the plurality of blocks may include a first sub-block configured to perform convolution by using a binarized feature map with a binarized weight; and a second sub-block configured to perform batch-normalization on an output of the first sub-block. A register may be disposed between the first sub-block and the second sub-block. Each of the first sub-block and the second sub-block may include one or more processing engines. The first sub-block or the second sub-block may further include a line-buffer disposed between an input unit and an output unit thereof. The electronic apparatus may further comprise: a second block configured to perform max-pooling on an output of the second sub-block.

According to the present disclosures, an efficient hardware architecture for implementing a BNN is provided.

In addition, an efficient streaming architecture for BNN is provided according to the present disclosures.

BRIEF DESCRIPTION OF THE DRAWINGS

FIG. 13 is a schematic diagram illustrating all six-loops as codes in a convolution operation.

DETAILED DESCRIPTION OF THE EMBODIMENT

Figure 1:
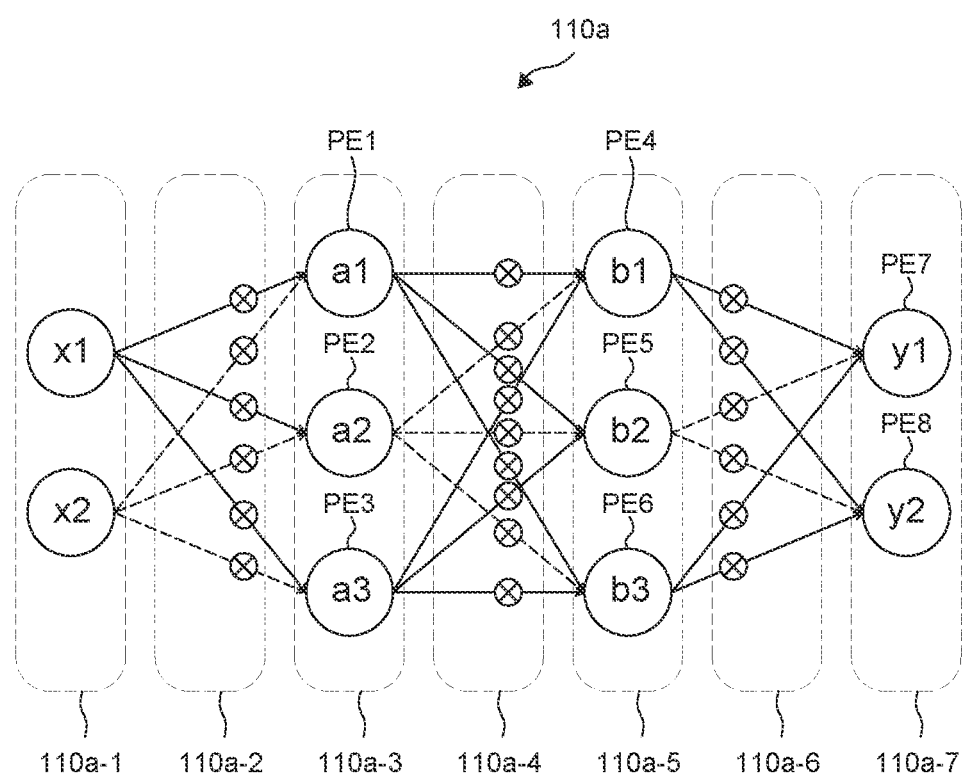
FIG. 1 is a schematic conceptual diagram illustrating an exemplary artificial neural network model.

Specific structural or step-by-step descriptions for the embodiments according to the concept of the present disclosure disclosed in the present specification or application are merely illustrative for the purpose of describing the embodiments according to the concept of the present disclosure. The examples according to the concept of the present disclosure may be carried out in various forms and are not interpreted to be limited to the examples described in the present specification or application.

Since the embodiment according to the concept of the present disclosure may have various changes and may have various forms, specific embodiments will be illustrated in the drawings and described in detail in the present disclosure or application. However, it should be understood that the examples according to the concept of the present disclosure are not limited to the specific examples, but include all changes, equivalents, or alternatives which are included in the spirit and technical scope of the present disclosure.

Terminologies such as first and/or second may be used to describe various components but the components are not limited by the above terminologies. The above terminologies are used to distinguish one element from the other element. For example, a first element may be referred to as a second element without departing from a scope in accordance with the concept of the present disclosure and similarly, a second element may be referred to as a first element.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween. Other expressions which describe the relationship between components, for example, "between" or "directly between" or "adjacent to" and "directly adjacent to" should be interpreted in the same manner.

Terminologies used in the present disclosure are used only to describe specific examples, and are not intended to limit the present disclosure. A singular form may include a plural form if there is no clearly opposite meaning in the context. In the present specification, it should be understood that terms "include" or "have" indicate that a feature, a number, a step, an operation, a component, a part, or a combination thereof described in the specification is present, but do not exclude a possibility of presence or addition of one or more other features, numbers, steps, operations, components, parts, or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if it is not clearly defined in this specification.

When the examples are described, a technology which is well known in the technical field of the present disclosure and is not directly related to the present disclosure may be omitted. The reason is that unnecessary description is omitted to clearly transmit the gist of the present disclosure without obscuring the gist.

Definition of Terminologies

Here, in order to help the understanding of the disclosure proposed in the present specification, terminologies used in the present specification will be defined in brief.

NPU is an abbreviation for a neural processing unit (or an electronic apparatus) and refers to a computer processor specialized for an operation of an artificial neural network model separately from the central processing unit (CPU).

ANN is an abbreviation for a computer-implemented artificial neural network and refers to a network which connects nodes in a layered structure by imitating the connection of the neurons in the human brain through a synapse to imitate human intelligence.

DNN is an abbreviation for a deep neural network and may mean that the number of hidden layers of the artificial neural network is increased to implement higher artificial intelligence.

CNN is an abbreviation for a convolutional neural network and is a neural network which functions similar to the image processing performed in a visual cortex of the human brain. The convolutional neural network is known to be appropriate for image processing and is known to be easy to extract features of input data and identify the pattern of the features.

Hereinafter, the present disclosure will be described in detail by describing preferred examples of the present disclosure with reference to the accompanying drawings. Hereinafter, examples of the present disclosure will be described in detail with reference to the accompanying drawings.

FIG. 1 is a schematic conceptual diagram illustrating a schematic artificial neural network model.

Hereinafter, the operation of the shown artificial neural network model 110a that can be operated in the neural network processing unit (not shown, but conventionally understood as a computing processing chip or a plurality of computing processing chips) will be described.

The shown artificial neural network model 110a of FIG. 1 may be an artificial neural network trained to perform various inference functions, such as object recognition and voice recognition.

The artificial neural network model 110a may be a deep neural network (DNN).

However, the artificial neural network model 110a according to examples of the present disclosure is not limited to a deep neural network.

For example, the artificial neural network model 110a may be implemented as a model such as Transformer, YOLO, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3 and the like. However, the present disclosure is not limited to the above-described models. Also, the artificial neural network model 110a may be an ensemble model based on at least two different models.

Hereinafter, an inference process performed by the exemplary artificial neural network model 110a will be described.

The artificial neural network model 110a may be a sample of a deep neural network model including an input layer 110a-1, a first connection network 110a-2, a first hidden layer 110a-3, a second connection network 110a-4, a second hidden layer 110a-5, a third connection network 110a-6, and an output layer 110a-7. The first hidden layer 110a-3 and the second hidden layer 110a-5 may also be referred to as a plurality of hidden layers. It is noted that the present disclosure is not limited only to the artificial neural network model 110a illustrated in FIG. 1.

The input layer 110a-1 may exemplarily include input nodes x1 and x2. That is, the input layer 110a-1 may include information about two input values. It is noted that the input layer 110a-1 may include information about more than two input values.

For example, the first connection network 110a-2 may include but is not limited to information about six weight values for connecting nodes of the input layer 110a-1 to nodes (i.e., the shown 3 nodes) of the first hidden layer 110a-3, respectively. Each weight value is multiplied with the input node value, and an accumulated value of the multiplied values is stored in the first hidden layer 110a-3.

It is noted that the first hidden layer 110a-3 and the second hidden layer 110a-5 may include more than three nodes. As shown in FIG. 1, the first hidden layer 110a-3 may include nodes a1, a2, and a3. That is, the first hidden layer 110a-3 may include information about three node values.

For example, the second connection network 110a-4 may include information about nine weight values for connecting the three nodes of the first hidden layer 110a-3 to the three nodes of the second hidden layer 110a-5, respectively. It is noted that the second connection network 110a-4, like any other connection network, may include information not limited to a certain fixed number of weight values. The weight value of the second connection network 110a-4 is multiplied with the node value input from the corresponding first hidden layer 110a-3 and the accumulated value of the multiplied values is stored in the second hidden layer 110a-5.

For example, the second hidden layer 110a-5 may include nodes b1, b2, and b3. That is, the second hidden layer 110a-5 may include information about three node values. It is noted that the number of nodes induced in any hidden layer is not limited to three.

For example, the third connection network 110a-6 may include information about six weight values which connect nodes of the second hidden layer 110a-5 and nodes of the output layer 110a-7, respectively. The weight value of the third connection network 110a-6 is multiplied with the node value input from the second hidden layer 110a-5, and the accumulated value of the multiplied values is stored in the output layer 110a-7.

For example, the output layer 110a-7 may include nodes y1 and y2. That is, the output layer 110a-7 may include information about two node values. It is worth repeatedly noting that the number of nodes included in each layer is not limited to the number as shown in the sample model in FIG. 1.

Figure 2A:
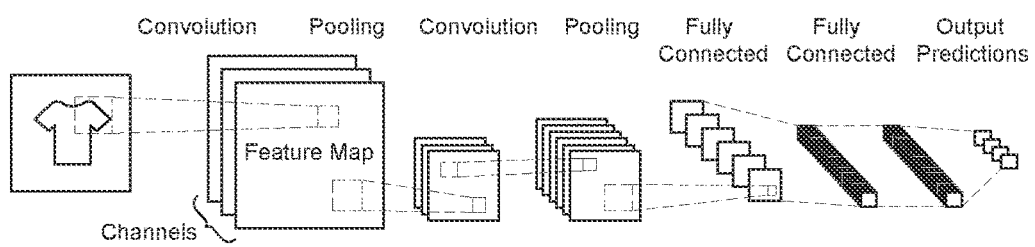
FIG. 2A is a schematic diagram showing a basic structure of a convolutional neural network (CNN).

FIG. 2A is a schematic diagram showing a basic structure of a convolutional neural network (CNN).

Referring to FIG. 2A, an input image may be displayed as a two-dimensional matrix including rows of a specific size and columns of a specific size. The input image may have a plurality of channels, wherein the channels may represent the number of color components of the input data image.

The convolution process means performing a convolution operation with the kernel (i.e., the two-dimensional matrix) while traversing the input image at a specified interval.

When the convolutional neural network goes from the current layer to the next layer, it can be transmitted to the next layer by reflecting the weights between layers through convolution.

For example, convolution can be defined by two main parameters: the size of the input image (typically a 1×1, 3×3 or 5×5 matrix) and the depth of the output feature map (the number of kernels) and these key parameters can be computed by convolution. These convolutions may start at depth 32, continue to depth 64, and end at depth 128 or 256.

Convolution can be executed by sliding these windows of size 3×3 or 5×5 over the 3D input feature map, stopping at every position, and extracting 3D patches of surrounding features.

Each of these 3D patches can be transformed into a 1D vector through tensor multiplication with the same learning weight matrix called weights. These vectors can be spatially reassembled into a 3D output map. All spatial locations of the output feature map may correspond to the same location of the input feature map.

A convolutional neural network may include a convolutional layer that performs a convolution operation between input data and a kernel (i.e., a weight matrix) that is learned over many iterations of gradient update during a learning process. If (m, n) is the kernel size and W is set as the weight value, the convolution layer can perform convolution of the input data and the weight matrix by calculating the dot product.

The step size that the kernel slides across the input data is called the stride length, and the kernel area (m×n) can be called the receptive field. The same convolutional kernel is applied across different locations of the input, which reduces the number of kernels learned. This also enables position invariant learning, wherein if a significant pattern is present in the input, the convolution filter can learn that pattern regardless of the position of the sequence.

A convolutional neural network can be tuned or trained so that input data lead to specific inference output. A convolutional neural network may be tuned using backpropagation based on comparisons between the inference output and the ground truth until the inference output progressively matches or approximates the ground truth.

A convolutional neural network can be trained by adjusting the weights between neurons based on the difference between the ground truth data and the actual output.

Figure 2B:
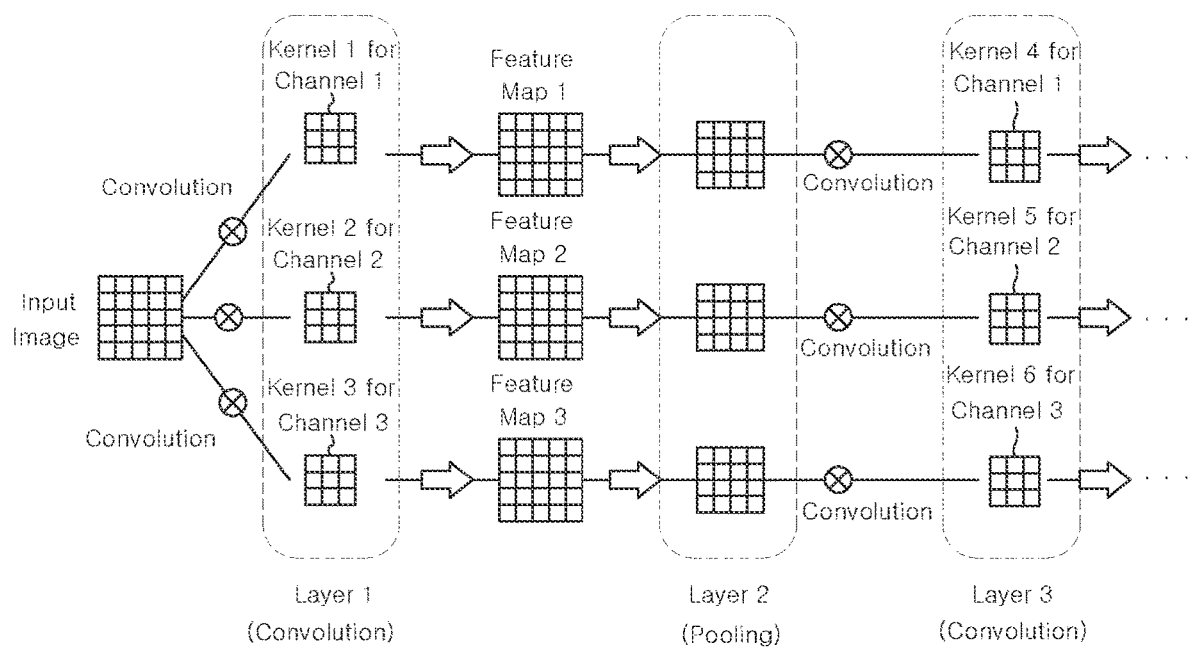
FIG. 2B is a schematic diagram showing the operation of the convolutional neural network illustratively.

FIG. 2B is a schematic diagram showing the operation of the convolutional neural network illustratively.

Referring to FIG. 2B, for example, an input image is shown as a two-dimensional matrix having a size of 5×5. In addition, the diagram illustrates three nodes, i.e., channel 1, channel 2, and channel 3, as a way of illustration.

At convolution layer 1, the convolution operations are independently conducted in multiple channels, each of which processes one kernel.

The input image is convolved with kernel 1, 2, and 3 for channel 1, 2, and 3 at the first, second, and third node of layer 1 respectively, and as the results, feature maps 1, 2, and 3 are output respectively.

Similarly, at the pooling layer 2, the pooling operations are independently conducted in multiple channels, each of which processes one kernel.

The feature maps 1, 2, and 3 output from the layer 1 are input to the three nodes of the layer 2. Layer 2 may receive feature maps output from layer 1 as input and perform pooling. The pooling may reduce the size or emphasize a specific value in a matrix. Pooling methods include max-pooling, average pooling, and minpooling. Maximum pooling (max-pooling) is used to collect the maximum values in a specific region of a matrix, average pooling can be used to find the average within a specific region, and min-pooling can be used to select the minimum pixel value with a specific region of a matrix.

In the example of FIG. 2B, the size of each of the feature map of a 5×5 matrix is reduced to a 4×4 matrix by pooling.

Specifically, the first node of the layer 2 receives the feature map 1 for channel 1 as an input, performs pooling, and outputs it as, for example, a 4×4 matrix. The second node of layer 2 receives the feature map 2 for channel 2 as an input, performs pooling, and outputs, for example, a 4×4 matrix. The third node of layer 2 receives the feature map 3 for channel 3 as an input, performs pooling, and outputs it as a 4×4 matrix, for example.

Similarly, at the convolution layer 3, the convolution operations are independently conducted in multiple channels, each of which processes one kernel.

The first node of layer 3 receives the output from the first node of layer 2 as input, performs convolution with kernel 4, and outputs the result. The second node of layer 3 receives the output from the second node of layer 2 as an input, performs convolution with kernel 5 for channel 2, and outputs the result. Similarly, the third node of layer 3 receives the output from the third node of layer 2 as input, performs convolution with kernel 6 for channel 3, and outputs the result.

In this way, convolution and pooling are repeated in an alternative interval, and finally, a fully connected layer may be output. The corresponding output may be input to an artificial neural network for image recognition again.

The CNN described so far is the most used method in the computer vision field among various deep neural network (DNN) methods.

However, one of the disadvantages of performing CNN is that it has to compute a very large amount of floating-point numbers and requires additional parameters for floating-point numbers. Therefore, the CNN operation is usually accelerated/facilitated by using specialized hardware, such as a graphic processing unit (GPU). In particular, various deep learning development frameworks such as TensorFlow, ONNX, and PyTorch have appeared, and these frameworks allow users to easily accelerate computation using GPUs. However, GPUs have the disadvantage of consuming a lot of electrical power, making them unsuitable for performing CNNs in small computing systems.

Therefore, research has been conducted to accelerate CNN using field programmable gate array (FPGA) or application specific integrated circuit (ASIC)-based hardware that consumes much less power but has lower processing speed than GPU. ASIC-based accelerators typically outperform FPGA-based accelerators in terms of both performance and energy efficiency. The main reason is that ASICs can run at lower power consumption and faster clocks than FPGAs.

On the other hand, the memory requirement of running a CNN remains high because it requires a very large number of parameters due to the characteristics of CNN, that is, floating point calculations. In the case of AlexNet, a CNN structure that won the 2012 ImageNet recognition challenge, about 240 MB of parameters were required for floating point. This size of parameters is problematic as it is unsuitable for storage in the memory of a small computing system. In order to solve this problem, a study on a low precision network that reduces the size of the input value or the parameter size of the layer of the CNN is desired and has been conducted.

<Binarized Neural Network (BNN)>

Among the studies of low precision networks, a binarized neural network (BNN) emerged.

Binarized neural network (BNN) is an extreme structure even in the structure of a low precision neural network, in which the weight and the layer input value are binarized to +1/−1. That is, a BNN is a neural network composed of 1-bit parameters. In a BNN, the multiplication and accumulation (MAC) operation of CNN is simplified, and there is little difference in accuracy of the outcome from a CNN using floating point for low-complexity images (CIFAR-10, MNIST, SVHN).

This BNN has an efficient structure for accelerated processing by less-power-consuming hardware. The biggest reason is that the size of memory required to load the existing parameters has been reduced by about 32 times, and as a result of the reduction, it is easy to load most of the parameters in on-chip RAM.

As such, since a BNN does not require multiplication operation and memory usage is extremely reduced, hardware resources and electricity consumption trimmed down to make the machine learning via a BNN more economical.

More specifically, a BNN uses XNOR operation (in lieu of multiplications and cumulative additions), which is a logical operation, to perform 1-bit operation. Multiplication can be implemented through XNOR operation, and cumulative addition can be implemented through the pop-count instruction that can determine the number of bits set to 1 in the register. Therefore, real number (i.e., floating number) or integer multiplication and addition are not required, thereby increasing the operation speed. That is, since the operation unit is reduced from 32 bits to 1 bit, the memory bandwidth, in theory, is increased by 32 times.

Table 1 below is an example of an XNOR operation.

TABLE 1

| Input | | Output |
|---|---|---|
| a | b | a XNOR b |
| 0 | 0 | 1 |
| 0 | 1 | 0 |
| 1 | 0 | 0 |
| 1 | 1 | 1 |

To implement cumulative addition after multiplication, the pop-count instruction is utilized. The pop-count command returns the number of bits set to 1 in the bit as shown in Table 2 below. Cumulative addition is possible by multiplying the result of pop-count instruction by 2 and subtracting the total number of bits.

TABLE 2

| 8-bit register a | 1011 0100 |
|---|---|
| 8-bit register b | 0110 1101 |
| a XNOR b | 0010 0110 |
| pop-count (a XNOR b) | 3 |
| 2 * pop-count (a XNOR b) − 8 | −2 |

After binarizing the parameters of the BNN as shown in the following equation, N multiplications can be accelerated through one XNOR logic operation by packing N parameters in N-bit registers.

$$\gamma_b = \begin{cases} +1, & \text{if } \gamma \geq 0, \\ -1, & \text{otherwise} \end{cases} \quad \text{[Equation 1]}$$

Above is the general concept of BNN described at the theoretical level. However, the theoretical concept of BNN leaves a lot of practical nuances to be ironed out to make BNN useful. Hereinafter, the system, device, and apparatus disclosed as embodiments of materialized BNN will be described.

Examples of the Present Disclosure

Introduction

Recently, machine learning (ML) has become one of the most popular technologies because it can be easily applied in various fields. In particular, DNN, as one approach of ML, has been proven to have high accuracy and remarkable performance in performing classification tasks in computer vision and speech recognition fields.

For many applications that require higher accuracy while having large data sets, there is a tendency to study deep neural networks with more parameters and layers with larger model size. As DNNs become more complex, the memory demands for parameter storage also increase and require more computations, which greatly affects power and resource efficiency.

In particular, in order to handle the increased number of operations, a larger number of logic gates are required in designs for implementation in FPGAs or ASICs, resulting in increased energy consumption while lowering processing performance. On the other hand, data required for most large DNNs may not be completely stored in an internal (on-chip)

memory, and thus an external memory (e.g., off-chip DRAM) must be frequently accessed. Such access consumes considerable energy and time, and computation performance degradation.

Among recent studies, optimization methods for improving DNN performance have been suggested, and one of these various methods is a method of lowering the calculation precision for potentially redundant information. In this method, since all parameters are binarized, the size of memory demand can be drastically reduced, and since the multiplication operation is replaced with the XNOR function, the size of the operation can be reduced, and thus the energy consumption can be dramatically reduced. However, binarizing all parameter and feature map values has its own disadvantage—lower accuracy.

Accordingly, an example of the present disclosure aims to provide a BNN accelerator (i.e., NPU, a hardware architecture/device) that can efficiently use resources while achieving the best performance and maintaining high accuracy.

There are two approaches to implementing a DNN in hardware. The first approach is a single layer architecture, in which one hardware block processes one layer at a time, that is, a layer-by-layer architecture. The second is a streaming architecture that implements the entire DNN. Compared to the single-layer architecture, the streaming architecture can dramatically increase performance regardless of the number of layers. However, the streaming architecture has disadvantages such as high cost and low flexibility in design.

Therefore, the example of the present disclosure presents an optimally balanced BNN streaming hardware with the optimal performance and efficiency. The optimal performance and efficiency may be expressed as a ratio of power to frame per second (FPS).

The main features of the hardware architecture presented by the example of the present disclosure may be summarized as follows.

An efficient pipeline unrolling mechanism that maximizes the utilization of the max-pooling layer: a line buffer can provide more than one input window at the same time. Therefore, since the OR operation can always be utilized in the pooling layer, power and resource efficiency can be improved. Also, due to the nature of the streaming architecture, the memory for storing weight values may be eliminated. Accordingly, the XNOR logic gate may be removed from the binary convolution layer or replaced with a NOT gate.

A combination of a weight reuse scheme and a K-mean which is referred to as a MAC operation, is applied to both the conventional convolutional layer and the fully-connected layer: through this, additional hardware costs, timing consumption and the number of flip-flops used for synchronization can be reduced. Moreover, since the proposed architecture is a streaming architecture, the MAC operation method can be implemented directly without using additional hardware.

MAC operator that compresses the pop-count tree with two options for the adder (i.e., a 6-bit adder and a 3-bit add compressor). It is a design that helps reduce resources and energy, and can provide more than one output using the same pop-count command.

A proposed accelerator (i.e., NPU) facilitates hardware implementation for various types and a workflow for automating the hardware implementation. In particular, the workflow includes the number of convolutional layers, the number of fully connected layers (FCNs), the number of channels, the bit-width setting for the input of each layer, and the channels using the same pop-count command, and a script automatically generates RTL code (Register Transfer Level code) based on details provided by the same user.

In order to verify the performance of the proposed architecture, tests were conducted using the MNIST and Cifar-10 benchmark data sets, and as a result, it was confirmed that it consumes 3 times less lookup table (LUT) compared to the conventional architecture with the same accuracy and exhibited almost the same FPS/W. Also, the proposed architecture could eliminate the FPGA block RAM and DSP. Through this performance verification, it was confirmed that the architecture proposed in the present disclosure is a BNN hardware architecture with the best power and area efficiency paired with high accuracy.

In the following section II, theories used to optimize the BNN hardware implementation will be described in detail. In section III, the proposed hardware architecture is described in detail. In section IV, the process of generating a register transfer level (RTL) design and the performance of the architecture proposed in the present disclosure are described in comparison with other studies.

II. BNN THEORY BACKGROUND FOR UNDERSTANDING THE PROPOSED HARDWARE ARCHITECTURE

II-1. Theoretical Background of BNN

BNN is a kind of artificial neural network in which weights and active outputs are limited to positive and negative values, i.e., −1 and +1. To convert real variables into these values, two different binarizing functions can be used. First, the deterministic function is as follows:

$$x^b = \text{Sign}(x) = \begin{cases} +1, \text{ if } x \geq 0 \\ -1, \text{ otherwise} \end{cases} \quad \text{[Equation 2]}$$

Second, the stochastic function is as follows:

$$x^b = \text{Sign}(x) = \begin{cases} +1, \text{ with probability } \rho = \sigma(x) \\ -1, \text{ with probability } 1 - \rho \end{cases} \quad \text{[Equation 3]}$$

Here, $\sigma(x) = \max(0; \min(1, (x+1)/2))$, and $x^b$ is the output of the function after binarization. While deterministic functions are implemented in actual hardware, probabilistic functions are implemented in actual hardware as well.

Figure 3:
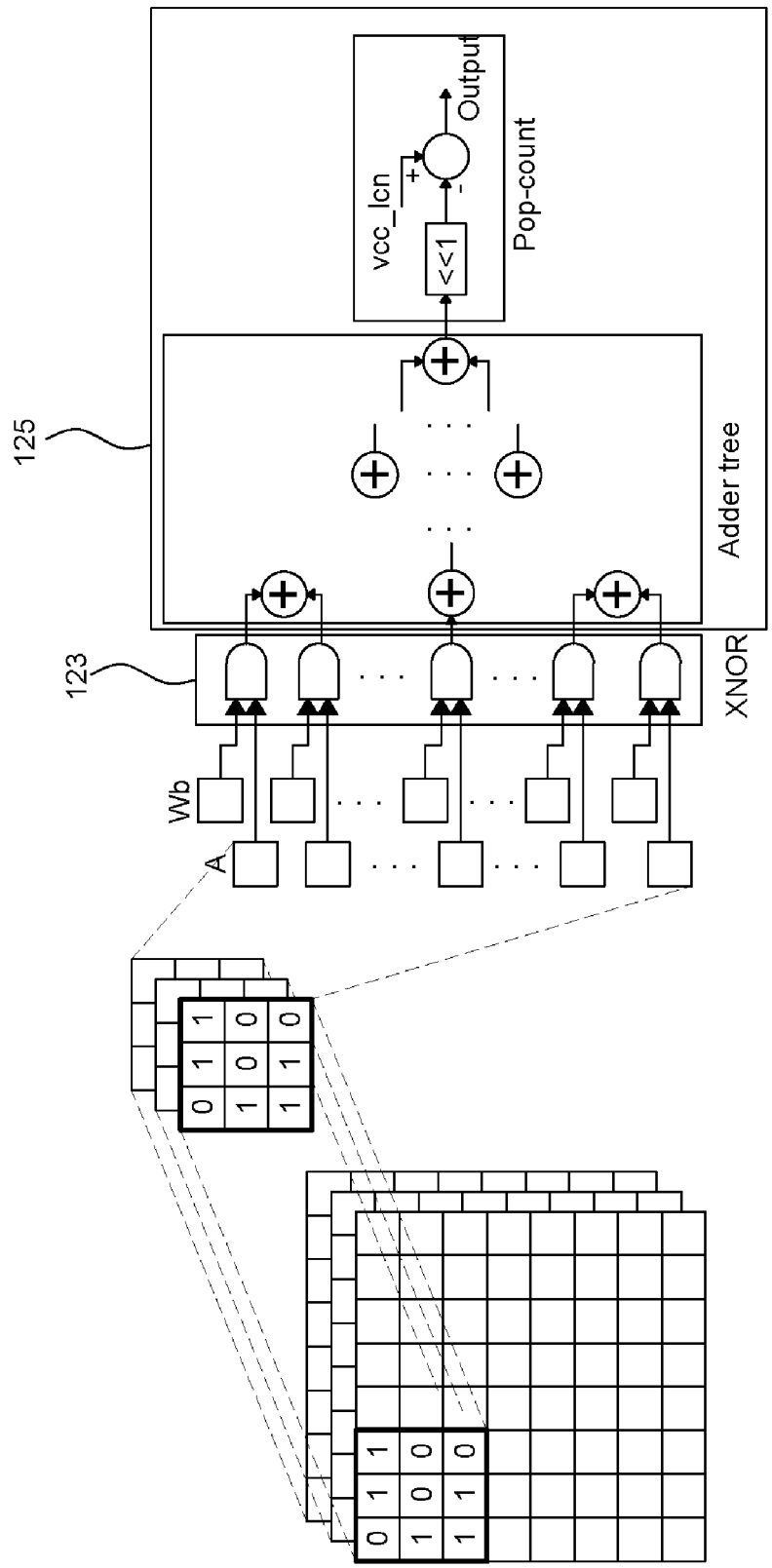
FIG. 3 is a schematic diagram illustrating a structure for performing an XNOR operation and an accumulation operation in a convolutional layer of a CNN.

FIG. 3 is a schematic diagram illustrating a structure for performing an XNOR operation and an accumulation operation in a convolutional layer.

By using the binarizing function in BNN, all weights and outputs for the convolutional layer and the fully connected layer are reduced to one bit before being used for the next operation.

Accordingly, all multiplication operations that consume a lot of hardware resources can be replaced with a much simpler XNOR logic gate 123 as shown in FIG. 3. The adder tree 125 shown in FIG. 3 used for the next process, accumulation, includes a pop-count performing unit, so that its structure can be made much simpler.

In addition, since the MAC (i.e., multiply-accumulate) operation is a major factor in overloading the neural network, BNN performance can be improved by using batch-normalization and max-pooling. The techniques applied to each type of operation are as follows.

1) Batch-Normalization and Binarization in BNN

Unlike MAC operations, batch-normalization functions use floating-point parameters and operations such as division, root-square, and multiplication. In general, the batch-normalized value of X can be calculated as follows:

$$Y = \frac{X - \mu}{\sqrt{var + \varepsilon}} \gamma + \beta \quad \text{[Equation 4]}$$

where $\varepsilon$ is a small number to avoid round-off problems.

$\mu$ and var represent the mean, and $\gamma$ and $\beta$, variables of the training data, are constants obtained during the learning process.

This normalized value Y can be binarized as follows:

$$Z = \begin{cases} 1, & \text{if } Y \geq 0 \\ 0, & \text{if } Y \leq 0 \end{cases}; \quad \text{[Equation 5]}$$

The two steps including normalization and binarization can be combined into one through a simpler threshold comparison process as shown in the following equation.

$$Z = 1 \Leftrightarrow \frac{X - \mu}{\sqrt{var + \varepsilon}} \gamma + \beta \geq 0 \quad \text{[Equation 6]}$$

If $$\text{sign}(\gamma) = \begin{cases} 1 & \text{if } \gamma > 0 \\ 0 & \text{if } \gamma < 0 \end{cases}$$

then, the following equation can be used.

$$Z = \left(X \geq \left(\frac{-\beta\sqrt{var + \varepsilon}}{\gamma} + \mu\right)\right) XNOR \text{ sign}(\gamma) \quad \text{[Equation 7]}$$

Furthermore, the combination of batch-normalization and binarization in a hardware implementation results in the output of a comparator and successive XNOR gates.

2) Maximum Pooling Operation in BNN

In BNN, after the batch-normalization operation, some layers may use max-pooling to reduce activation of input for successive layers. Theoretically, the output of the max-pooling operation can be binarized before being passed to the next layer. By exchanging the binarization module and the max-pooling module with each other, the batch-normalization and the binary function can be combined and output the result Z. In addition, calculating the maximum values of a binary window is equivalent to taking a binary value as input and finding the output of an OR operation.

Figure 4A:
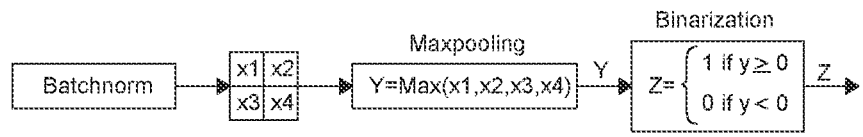
FIGS. 4A, 4B and 4C show examples of combining batch-normalization, binarization and max-pooling in a pipeline architecture.
Figure 4B:
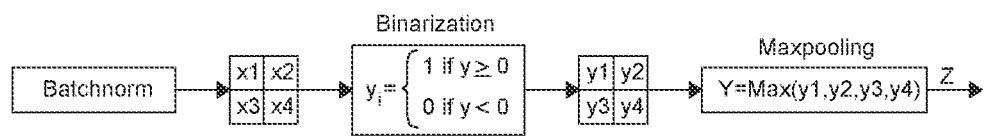
Figure 4C:
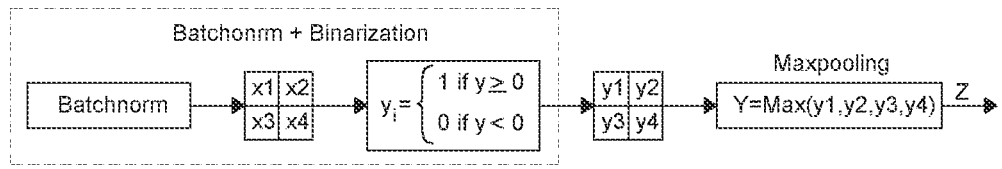

FIGS. 4A, 4B and 4C show examples of combining batch-normalization, binarization and max-pooling in a pipeline architecture.

As shown in FIGS. 4A to 4C, a series of processes starting with batch-normalization and performing an OR operation may be represented as one pipeline. From a hardware implementation point of view, the OR operation is much simpler compared to computing the maximum value function in a non-binary neural network.

3) Weight Reuse Scheme

As described above, BNN has been proposed as a solution for minimizing hardware resources and power consumption. In particular, the BNN model with one bit-width has become known as an efficient solution that can reduce the computational load while maximizing data processing by using the operation of the XNOR logic gate and the pop-count instruction. However, when examining the pattern of weight values, additional optimization is needed because general BNN models still have redundant clutter. Through the additional optimization, it is possible to reduce some computational operations and reduce memory usage.

The binary number is used to represent the two states of "0" and "1". When randomly choosing a random binary number, the probability of being 0 or 1 is 50%. When randomly having two sets of N binary bits, the number of bits of the first set that are individually repeated in the second set may be considered. When calculating K output channels for a binary convolution layer, each bit in the set of input values containing (M×M×C) binary bits is replaced by (M×M×C) in the K set of binary kernel values. An XNOR operation can be performed with the corresponding bit. Here, M is the window size and C is the number of input channels. Consequently, a similar number of bits among two arbitrary sets of kernel bits can be considered.

Optimization can be achieved by reusing weights to take advantage of binary convolution. An XNOR operation and an operation by a pop-count instruction may be performed on a corresponding set of binary weight values (M×M×C) to generate an output, and the output may be reused to generate another output. For the purpose of having a straightforward visualization, it can be assumed that there are N different bits between the two sets of binary kernel bits. For all i from 1 to N, when A ($\{A_1, A_2, A_3, \ldots A_N\}$) exists for the first kernel set and B ($\{B_1, B_2, B_3, \ldots B_N\}$) exists for the second kernel set, it can be assumed that the set of unknown input feature maps is X $\{X_1, X_2, X_3, \ldots X_{M \times M \times C}\}$. Here, $\{X_1, X_2, \ldots X_N\}$ represents N different bits in the two sets of binarized bits. When performing XNOR one random bit using 1 and 0 and summing the two outputs, the final output is always 1. In order to generate N random bits, the following equation may be used.

$$N = \sum_{1}^{N} Xnor(A_i; X_i) + \sum_{1}^{N} Xnor(B_i; X_i) \quad \text{[Equation 8]}$$

In the two kernel sets, the left C ($\{C_1, C_2, C_3, \ldots C_{M \times M \times C-N}\}$) kernel bits are all identical. Accordingly, according to Equation 8, the result of performing the pop-count command for ($\{A, C\}$ XNOR X) may be calculated as in the following Equations.

$$P_1 = \sum_{1}^{N} Xnor(A_i; X_i) + \sum_{N+1}^{M \times M \times C} Xnor(C_{i-N}; X_i) \quad \text{[Equation 9]}$$

$$P_2 = \sum_{1}^{N} Xnor(B_i; X_i) + \sum_{N+1}^{M \times M \times C} Xnor(C_{i-N}; X_i)$$

$$= \sum_{1}^{N} Xnor(B_i; X_i) + P_1 - \sum_{1}^{N} Xnor(A_i; X_i)$$

$$= \sum_{1}^{N} Xnor(B_i; X_i) + P_1 - \left(N - \sum_{1}^{N} Xnor(B_i; X_i)\right) \quad \text{[Equation 10]}$$

Finally, the following equation can be used to calculate P2 based on P1.

$$P_2 = P_1 - N + 2\sum_{1}^{N} Xnor(B_i; X_i) \quad \text{[Equation 11]}$$

According to Equation 7, the output of the second channel can be calculated as follows.

$$O_2 = 2\left(P_1 - N + 2\sum_{1}^{N} Xnor(B_i; X_i)\right) - M \times M \times C \quad \text{[Equation 12]}$$

For the first convolutional layer, the entire input precision pixel can be used very similarly. Specifically, for the sum of two multiplications, the result is 0 (Ax−1 and Ax1). Here, A is any full precision pixel. Thus, it has to be considered that the number of bits that differ between the two sets of kernel bits, the sum of D multiplications between D arbitrary full-precision input pixels, and D different bits in the second channel, which is D and S2. The output of the second channel may be calculated using the following equation.

$$O_2 = O_1 - (0 - S_2) + S_2 = O_1 + 2S_2 \quad \text{[Equation 13]}$$

In this way, a full convolution operation can be implemented, which can save considerable hardware resources while compensating for accuracy.

III. ARCHITECTURE PROPOSED IN THE PRESENT DISCLOSURE

III-1. HIGH-LEVEL Streaming Architecture

Figure 5:
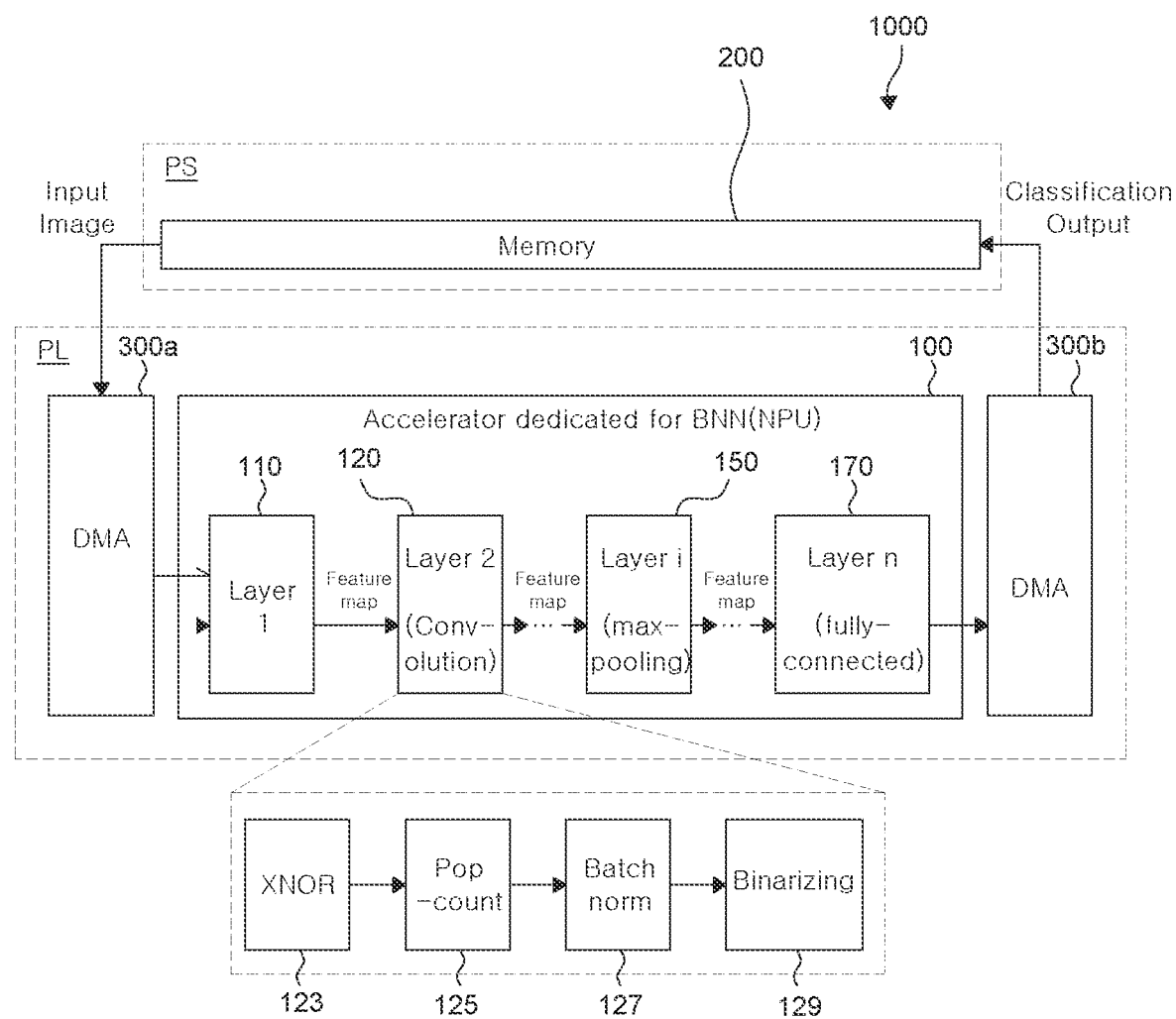
FIG. 5 is a schematic diagram illustrating the concept of the BNN streaming architecture proposed in the present disclosure.

FIG. 5 is a schematical diagram illustrating the concept of the BNN streaming architecture proposed in the present disclosure.

As can be seen with reference to FIG. 5, the BNN streaming architecture 1000 includes a dedicated BNN accelerator (i.e., a dedicated BNN NPU) 100 and a memory (e.g., a DDR memory) 200, and one or more direct memory access (DMA) 300a and/or 300b.

For example, the dedicated BNN accelerator (i.e., the dedicated BNN NPU) 100 and the DMAs 300a and/or 300b may be implemented as programmable logic (PL), and the memory 200 may be implemented as a processing system (PS).

The BNN dedicated accelerator (i.e., BNN dedicated NPU) 100 uses one or more direct memory access (DMA) 300a and/or 300b, and may be connected to a main memory (e.g., DDR memory) 200 through an AXI-4 stream bus.

The dedicated BNN accelerator (i.e., dedicated BNN NPU) 100 may include a first block 110 for the first layer, a second block 120 for the second layer, a third block 150 for the i$^{th}$ layer, and a fourth block 170 for the n$^{th}$ layer. In FIG. 5, it is illustrated that the second layer is a convolutional layer, the i$^{th}$ layer is the max-pooling layer, and the n$^{th}$ layer is a fully connected layer.

The memory 200 may be divided into two areas. A first area may be used to store an input image, and a second area may be used to store an output. The one or more DMAs 300a and/or 300b provide addresses and data lengths for the two memory areas. Each input pixel from the first memory area is sequentially transferred to a BNN dedicated accelerator (i.e., a BNN dedicated NPU) 100. After a predetermined processing time, the classification result for the input image is output and transferred to the second memory area.

Hereinafter, the bandwidth of the streaming data bus will be described.

Unlike conventional artificial neural network accelerators (e.g., general NPU) that can process only one layer of artificial neural networks, the dedicated BNN accelerator (i.e., dedicated BNN NPU) 100 presented in the present disclosure may implement the entire artificial neural network in hardware.

Dedicated BNN accelerator (i.e., dedicated BNN NPU) 100 presented in the present disclosure is based on a pipeline-type streaming architecture. That is, the dedicated BNN accelerator (i.e., the dedicated BNN NPU) 100 according to the present disclosure distributes the load generated while performing inference to layers. The number of pipelines is equal to the number of layers. Therefore, if pixels of the input image are continuously received, all layers can operate simultaneously, and very high performance can be achieved. Additionally, since the output of the previous layer is directly transferred to the next layer without intermediate storage, the propagation delay can be reduced and the size of the required memory can be remarkably reduced as well.

Meanwhile, since all layers are implemented with different hardware modules, input data can be continuously processed without interruption. If the number of layers increases, only the pipeline needs to be increased, so there may be no performance degradation. For example, if it is assumed that an image of size E*F is input, data of the input image may be transmitted every clock cycle. In this case, the dedicated BNN accelerator (i.e., the dedicated BNN NPU) 100 according to the present disclosure may finish the inference of classifying the image in merely E*F clock cycles. As a result, the performance of the dedicated BNN accelerator (i.e., the dedicated BNN NPU) 100 according to the disclosure of the present disclosure can be flexibly increased according to the number of image pixels input for every clock cycle.

Specifically, blocks for each layer may be implemented under a pipeline scheme. As shown in FIG. 5, the second block 120 for the second layer, that is, the convolutional layers may be divided into four parts (i.e., four sub-blocks). Schematically, as shown in FIG. 3, a first part (i.e., first sub-block) of the four parts is an XNOR logic gate 123 and performs a multiplication operation. The second part (i.e., second sub-block) is an adder tree 125 and may include a pop-count performing unit as shown in FIG. 3. In addition, the third part (i.e., third sub-block) may be the batch-normalization performing unit 127, and the fourth part (i.e., fourth sub-block) may be the binarization unit 129 for performing binarization.

If the third block 150 located after the second block 120 is for a max-pooling layer, the output of the binarization unit 129 can be transferred directly to a third block 150 for a max-pooling layer. As such, it is feasible to perfectly implement the convolutional layer and the pooling layer in the architecture presented in the present disclosure.

Figure 6:
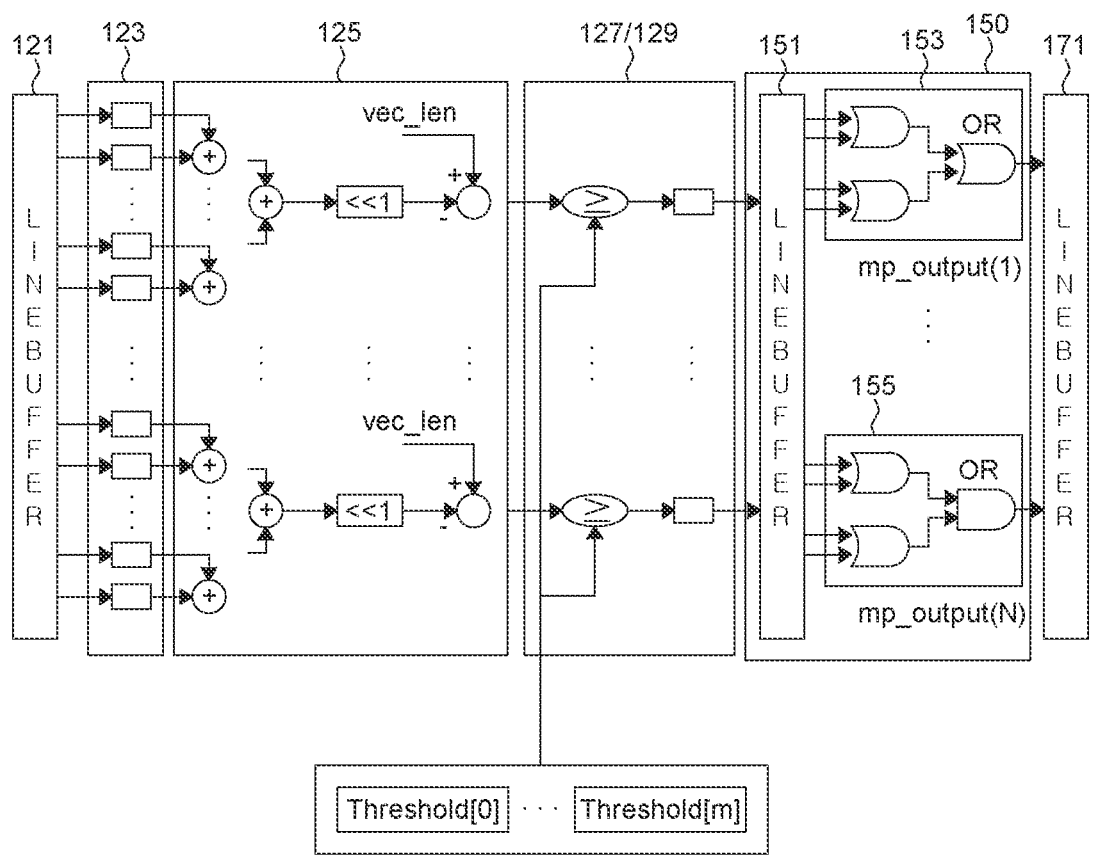
FIG. 6 is a schematic diagram illustrating a connection relationship between the second layer 120 and the third layer 150 shown in FIG. 5.

FIG. 6 is a schematic diagram illustrating a connection relationship between the second block 120 and the third layer 150 shown in FIG. 5.

As shown in FIG. 6, the second block 120 for the second layer shown in FIG. 5 may include an adder tree 125 including a first line buffer 121, a XNOR logic gate 123, and a pop-count performing unit, a batch-normalization performing unit 127 and a binarization unit 129.

In addition, the third block 150 shown in FIG. 5 may include the second line buffer 151 and the max-pooling performing unit 153 and/or 155 as shown in FIG. 6.

In order to complete the process from input to output of the layer, the values of pixels input from the previous layer are transferred to the first line buffer 121 of the second block. The first line buffer 121 transfers the values of each pixel to the XNOR logic gate 123. Specifically, when a predetermined number of pixel values are loaded into the first line buffer 121, the first line buffer 121 generates window values and transmits them to the XNOR logic gate 123.

The output of the XNOR logic gate 123 is compared with a pre-determined threshold value in the batch-normalization performing unit 127, and an appropriate operation is performed according to the weight γ for batch-normalization.

Meanwhile, according to an example of the present disclosure, not all parameters are stored, but only the pre-determined threshold value is stored for the batch-normalization performing unit 127. Therefore, the need of using memory for storing weights and the sign(γ) function for performing batch normalization can be completely eliminated. According to an example of the present disclosure as described above, the pre-determined threshold values may be transmitted without delay, thereby improving the processing speed.

Outputs of the batch-normalization performing unit 127 and the binarization unit 129 are transferred to the second line buffer 151 of the third block 150. In FIG. 6, although it is shown that the third block 150 for the maximum pooling layer is connected after the second block 120 for the convolutional layer, unlike what is shown in the figure, the third block 150 may be for a convolutional layer other than the maximum pooling layer as shown in the figure. That is to say, the third block 150 can be a layer of any nature to fit the need.

When a plurality of values loaded into the second line buffer 151 of the third block 150 reach a predetermined condition, an output window is generated and transmitted to the max-pooling performing unit 153 and/or 155.

The max-pooling performing unit 153 and/or 155 may convert data by performing an OR operation, and output the data to the third line buffer 171 of the fourth block of a subsequent layer if any.

III-2. Microarchitecture for Window Generation into Convolution and Pooling Layer Hereinafter, architectures for the convolution layer and the pooling layer will be described in detail.

Figure 7:
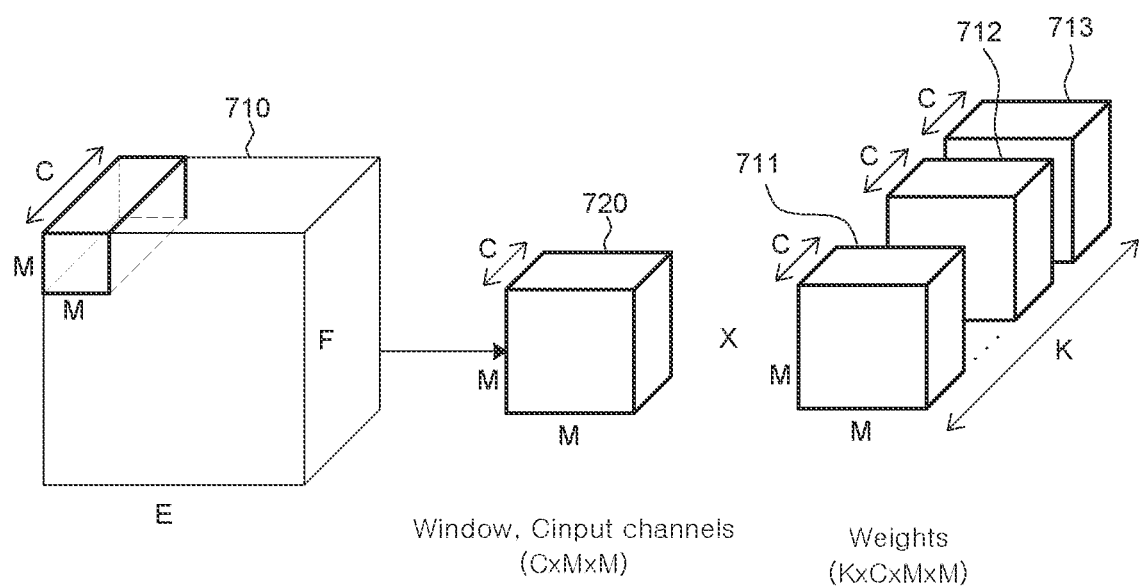
FIG. 7 is a schematic diagram illustrating an example of a general convolution between C window (M×M) and (K×C×M×M) filters.

FIG. 7 is a schematic diagram illustrating an example of a general convolution between C window (M×M) and (K×C×M×M) filters.

Referring to FIG. 7, an input feature map 710 of size (E×F) is shown for a clearer demonstration. The dimension/size of the filter 720 is represented as (M×M), and the number of input channels is represented as C. The number of output channels 711, 712, and 713 is represented as K.

For the convolution operation, a window containing data of the input feature map 710 of size (M×M) is multiplied with a filter 720 of the same size. For example, M may be 3, and the size of the pooling window in the pooling layer may be (2×2). In order to transfer data to a subsequent layer, a shift-register based line buffer may be disposed at a rear end of the previous layer. If such a shift-register-based line buffer is used, the operation can be performed immediately when the required amount of data is transferred without waiting for the feature map to be completely generated in the previous layer. That is, since each layer does not need to wait until the previous layer is finished, the processing time can be significantly reduced.

According to an example of the present disclosure, two types of line buffers are provided. The first type of line buffer may be a convolution line buffer (CLB), and the second type of line buffer may be a pooling line buffer (PLB).

For example, as shown in FIG. 6, the first type of line buffer (i.e., CLB) may be the first line buffer 121 in the second block 120. In this case, the first type of line buffer (i.e., CLB, that is, the first line buffer 121) may store values of input pixels from a previous layer and then provide a convolution window for a multiplication operation. In general, when the number of generated windows is only one, the first type of line buffer (i.e., CLB) may include a ((M−1)× E+M) pipeline register.

Figure 8:
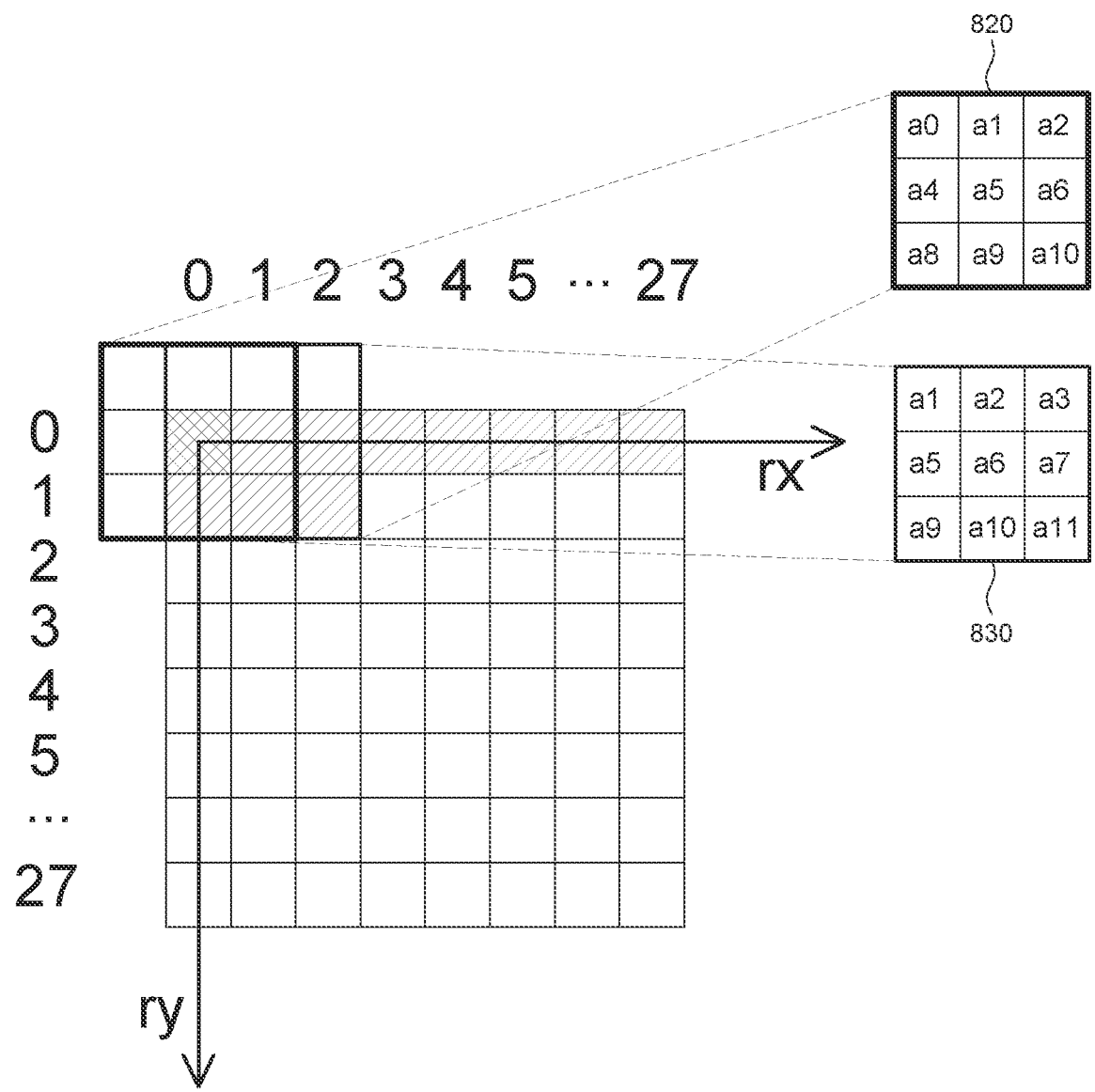
FIG. 8 is a schematic diagram illustrating an example of an output having two windows on a first type of line buffer (i.e., CLB).

FIG. 8 is a schematic diagram illustrating an example of an output having two windows on a first type of line buffer (i.e., CLB).

As shown in FIG. 8, when the number of generated windows 820 and 830 increases every N clock cycles, the size of the first type of line buffer (i.e., CLB) may reach ((M−1)×E+M+N−1). In the process of multiplication and pop-count operation, the number of operations may be N times greater than that of generating one window. When the number of registers on the first type of line buffer (i.e., CLB) is $$\left(E \times \left(M - \left\lfloor \frac{M}{2} \right\rfloor - 1\right) + \left\lfloor \frac{M}{2} \right\rfloor + N\right),$$

the first type of line buffer (i.e., CLB) begins to select appropriate values for the output window through the coordinates on the first type of line buffer (i.e., CLB). Next, after performing a pop-count operation, a corresponding valid output signal (e.g., out_valid) is asserted. For N>1, in order to continuously generate N windows every clock cycle, the first type of line buffer (i.e., CLB) receives N new input values during the same period. For the first convolutional layer, if the memory provides N input pixels every clock cycle, no problem would occur in all layers.

The detailed process is shown in Table 3.

TABLE 3

Algorithm 1.

Convolution line buffer pseudocode.

Input: Activation output of previous layer.
Output: Window (W) with size: M×M
1: for ix = 0 to M-1 do
2:   for iy = 0 to M-1 do
3:     for i = 0 to N-1 do
4:       $y = ry + iy \left\lfloor \frac{M}{2} \right\rfloor$
5:       $x = rx + ix + I \left\lfloor \frac{M}{2} \right\rfloor$
6:       if x < 0 or x ≥W then
7:         W[ix,iy]=padding_value
8:       else
9:         W[ix,iy]=L[(M-1-iy)E+(M-1-ix)+i]
10:      end if
11:    end for
12:  end for
13: end for In Table 3 above, rx and ry are window center coordinates on the frame. ix and iy represent the coordinates of each pixel on the window, and L represents a CLB with size ((M−1)×E+M+N−1).

In order to make algorithm 1 easier to understand, it will be described with reference to FIGS. 9 and 10.

Figure 9:
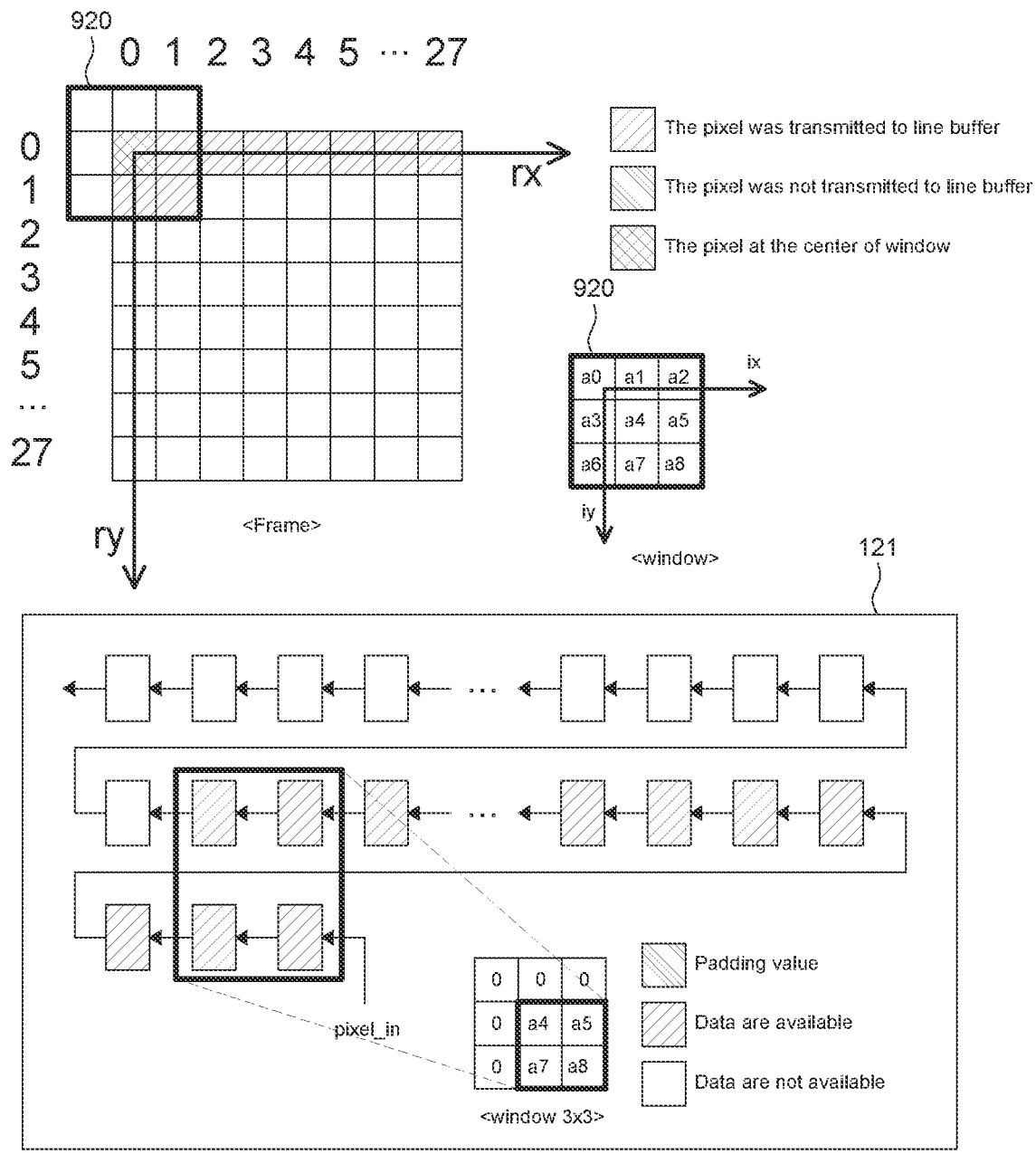
FIG. 9 is a schematic diagram illustrating the position of a window and a first type of line buffer (i.e., CLB) on an image frame when ready to generate output.

FIG. 9 is a schematic diagram illustrating the position of a window and a first type of line buffer (i.e., CLB) on an image frame when ready to generate output. FIG. 10 is a schematic diagram illustrating a position of a window and a first type of line buffer (i.e., CLB) on an image frame when execution is completed.

For example, as shown in FIG. 6, the first type of line buffer (i.e., CLB) may be the first line buffer 121 in the second block 120.

Figure 10:
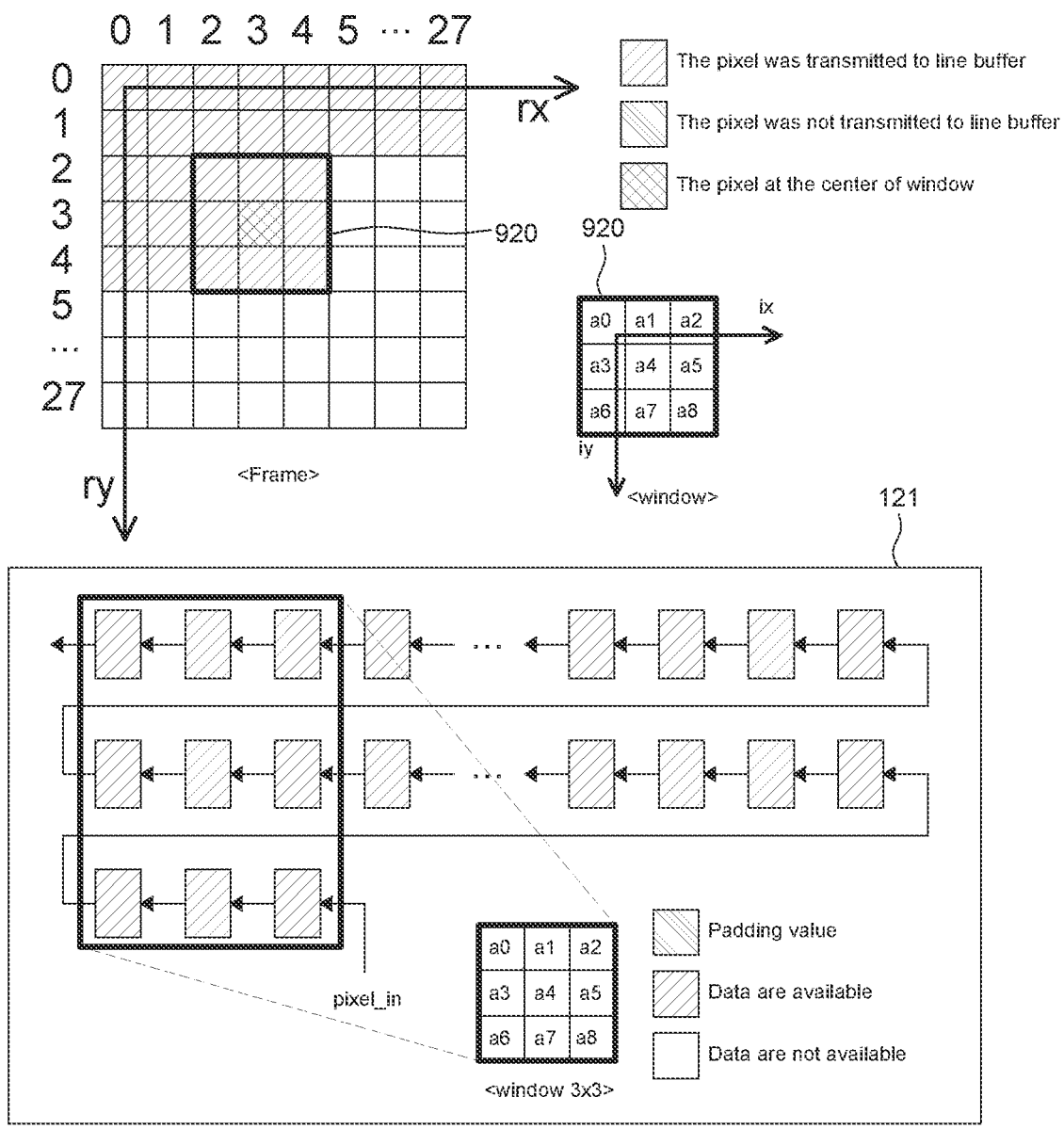
FIG. 10 is a schematic diagram illustrating a position of a window and a first type of line buffer (i.e., CLB) on an image frame when execution is completed.

The state of the first type of line buffer (i.e, CLB, that is, the first line buffer 121) is visually shown in FIG. 9, when the first type of line buffer (i.e., CLB, that is, the first line buffer 121) starts to generate an output using one window 920, and the state of the first type of line buffer (i.e., CLB, that is, the first line buffer 121) during image frame transmission is shown in FIG. 10. In the examples of FIGS. 9 and 10, M is 3 and E and F are 28 for the MNIST data set. In addition, when the Cifar-10 data set is used in the examples of FIGS. 9 and 10, E and F may be equal to 32.

On the other hand, the second type of line buffer may be a pooling line buffer (PLB). For example, the second type of line buffer (i.e., PLB) may be the second line buffer 151 in the third block 150 as shown in FIG. 6.

Specifically, as shown in FIG. 6, the second type of line buffer (i.e., PLB, that is, the second line buffer 151) is located at the front end in the third block 150 for the pooling layer and may be connected to the second block 120 including the batch normalization performing unit 127. Alternatively, the second type of line buffer (i.e., PLB, that is, the second line buffer 151) may be located outside the third block 150 and located between the second block and the third block. The output from the second block 120 is transferred to the second type of line buffer (i.e., PLB) and the second line buffer 151, and the windows generated from the PLB 151 are generated by the max-pooling performing unit 153 and/or 155.

Figure 11A:
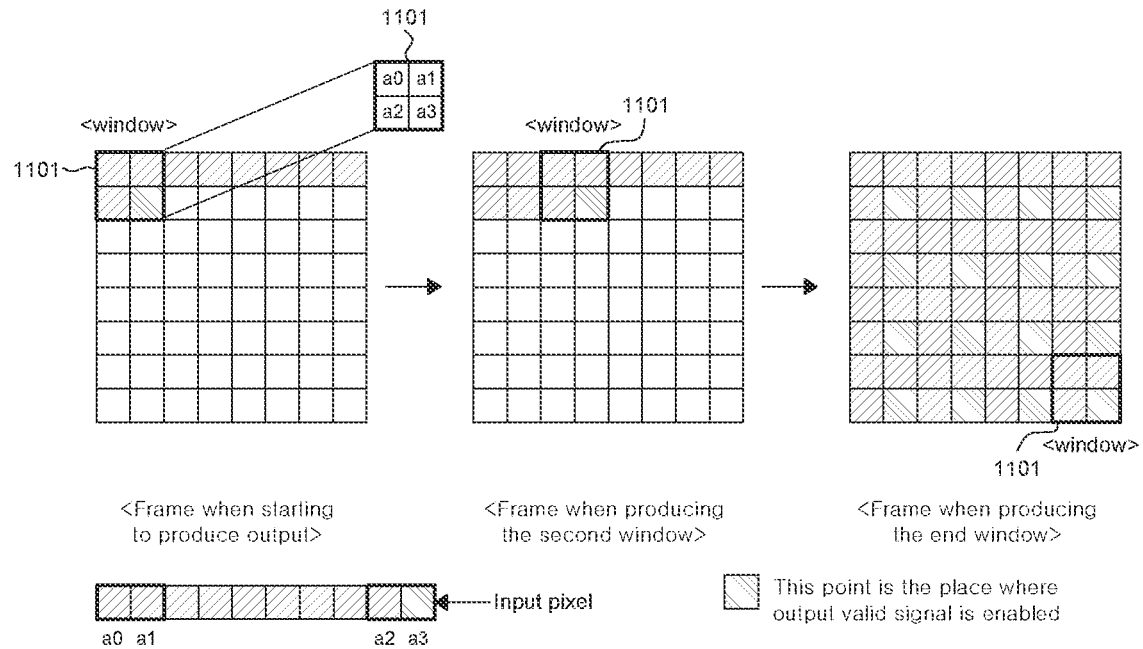
FIG. 11A is a schematic diagram illustrating a second type of line buffer (i.e., PLB)
Figure 11B:
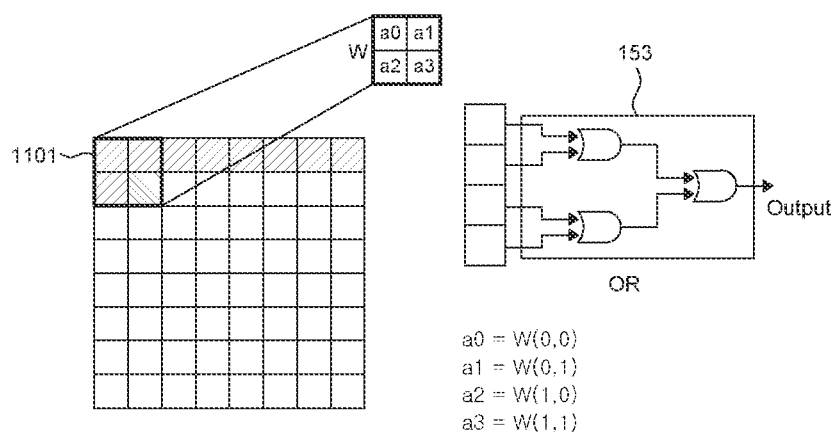
FIG. 11B is a schematic diagram illustrating an output of a second type of line buffer (i.e., PLB).

FIG. 11A is a schematic diagram illustrating a second type of line buffer (i.e., PLB), and FIG. 11B is a schematic diagram illustrating an output of a second type of line buffer (i.e., PLB).

The second type of line buffer (i.e., PLB) may be the second line buffer 151 in the third block 150 as shown in FIG. 6.

As shown in FIG. 11A, the second type of line buffer (i.e., PLB) may not consider padding on a boundary, compared to the first type of line buffer (i.e., CLB). Only valid signals can be asserted at corresponding locations in the input feature map. Assuming that the size of the window 1101 is 2×2 and the number of generated windows 1101 is 1, after every 2 clock cycles for the first pooling layer and for the $i^{th}$ pooling layer, a valid signal can be enabled after every 2*i clock cycles. This may satisfy the condition y % 2=0.

In order to use a spare interval between the two intervals in which the second type of line buffer (i.e., PLB) creates a window, an embodiment of the present disclosure provides to generate windows from the second type of line buffer (i.e., PLB) every clock cycle by increasing the level of input data.

In particular, when the max-pooling performing unit 153 shown in FIG. 11B is simultaneously provided with N (where N is >1 and is a multiple of 2) input values, the number of generated windows 1101 may be N/2. It can be confirmed that these windows in the pooling layer are generated every clock cycle when the condition y % 2=0 is satisfied. Accordingly, the second type of line buffer (i.e., PLB) may increase the processing speed N times for N values of parallel inputs. This means that hardware resources required for subsequent multiplication and pop-count operations can be cut in half.

The size of the second type of line buffer (i.e., PLB) will be described as follows. If the second type of line buffer (i.e., PLB) outputs N/2 windows corresponding to N parallel inputs, the size of the second type of line buffer may be determined by (E+N) registers. Further, when the size of the second type of line buffer (i.e., PLB) is (N/2>1) based on the number of parallel inputs provided from the previous layer, the size needs to be larger, and if (N/2=1), then the size does not need to be larger. Furthermore, the number of parallel input pixels does not need to be a power of two, nor need to be divided by E. For example, if the size of the pooling window is (2×2) and if the number N of parallel inputs from the previous layer is 2, the size of the second type of line buffer (i.e., PLB) may be determined by E+2 registers, and one pooling window may be generated twice every clock cycle. On the other hand, if the previous layer provides simultaneous inputs (N=4), the size of the second type of line buffer (i.e., PLB) may be determined by (E+4) registers, and two windows may be generated four times more than when (N=1) is used after every clock cycle.

From a perspective of operating mechanism, when the second type of line buffer (i.e., PLB) is completely filled with valid data, the second type of line buffer (i.e., PLB) starts to create a pooling window. In particular, the time delay from when the input signal is asserted to be valid can be determined based on (E+N)/N clock cycles. The details are described as algorithm 2 shown in the table below. Algorithm 2 is shown with reference to FIGS. 11A and 11B, which shows the operation of the line buffer when (N=1).

TABLE 4

Algorithm 2 Pooling line buffer pseudocode.

Input: Sequential pixel chain from output of the Batchnorm.
Output: window (W) with size: 2x2
 1: if (x+1) : N) and y%2 then
 2:   for i = 0 to N/2−1 do
 3:     W(i)(0,0) = L[E+1+2i]
 4:     W(i)(0,1) = L[E+2i]
 5:     W(i)(1,0) = L[1+2i]
 6:     W(i)(1,1) = L[0+2i]
 7:   end for
 8: end if III-3. Micro-Architecture for MAC Operation and Batchnorm After the above-described windows are created through the shift-register based line buffer, data go through a series of operations, i.e., multiplication operation, addition through a pop-count instruction, and batch-normalization before being transferred to the next layer. These processes are always the most important time paths and the sections that consume the most energy. For this reason, the operating clock frequency is lowered, and system performance is deteriorated.

However, in the architecture presented in the present disclosure, the data paths of these processes are optimal, and processing time delay can be minimized and power consumption can be reduced.

A detailed description is as follows.

First, since all weight values are constants in the multiplication operation, XNOR gates can be replaced with NOT gates when the weight value is 0, and when the weight value is 1, the input may be directly connected to the pop-count instruction processing unit. Similarly, in a batch-normalization operation, the sign value (i.e., γ) allows one to decide whether to use a NOT gate or an XNOR gate. As such, the NOT gate is selected based on the binarized weight or an input value is bypassed based on the binarized weight. By using the XNOR gate, the time delay can be significantly reduced and the use of memory resources can be minimized.

Second, the architecture presented in the present disclosure can efficiently process the BNN using parallelism, a pipeline technique, and weight reuse optimization.

This will be described in detail as follows.

1) Pipeline and Parallelism Mechanisms

A major factor in determining the performance of a processor is its maximum clock frequency. However, the major time paths act as a factor in lowering the clock frequency. Accordingly, the present disclosure proposes adding an intermediate register into the BNN architecture to shorten these time paths. System performance can be significantly improved after the initial delay cycle of the intermediate register. By arranging the intermediate registers in appropriate places based on the requirements (frequency, area, power) and parameter input (i.e., number of channels and input bit width), the delay path of the entire logic circuit can be shorter than the target clock period. An example of design of a pipeline that adds to the output of a multiplication operation is shown in FIG. 12.

Figure 12:
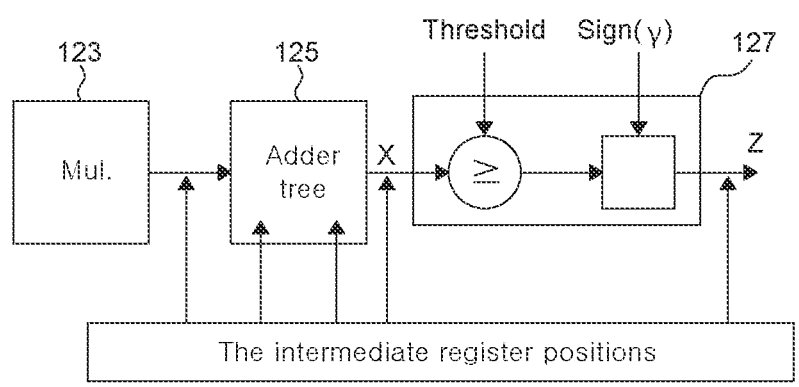
FIG. 12 is a schematic diagram illustrating an XNOR gate, an adder tree, and a pipeline of batch-normalization.

FIG. 12 is a schematic diagram illustrating an XNOR gate, an adder tree, and a pipeline of batch-normalization.

As shown in FIG. 12, an adder tree 125 including an XNOR gate 123 for a multiplication operation and a pop-count and a batch normalization performing unit 127 are connected by a pipeline.

An intermediate register may be disposed between the adder tree 125 including the XNOR gate 123 and the pop-count and the batch normalization performing unit 127. The intermediate register may be placed on a plurality of positions alternatively or simultaneously as illustrated in a drawing. For example, the first region of the intermediate register may transmit a necessary first parameter (e.g., X) through a pipeline between the XNOR gate 123 and the adder tree 125. In addition, the second region of the intermediate register may transmit a necessary second parameter (e.g., Z) through a pipeline between the adder tree 125 and the batch-normalization performing unit 127. Alternatively, a plurality of the intermediate registers may be provided. For example, the first intermediate register may transmit a necessary first parameter through a pipeline between the XNOR gate 123 and the adder tree 125. In addition, the second intermediate register may transmit a necessary second parameter through a pipeline between the adder tree 125 and the batch normalizer 127.

Regarding the parallelism technique, concurrent computing helps to improve overall system performance in hardware implementations. However, there is a trade-off in parallelism technique. Firstly, i) it requires a significant amount of hardware, which increases power consumption and ii) increases congestion, resulting in design difficulties. Since both weight data and feature map data are reduced to 1 bit in BNN, many loops in convolution operation cannot function properly without sufficient hardware resources. This will be described with reference to FIG. 13.

FIG. 13 is a schematic diagram illustrating all six-loops as codes in a convolution operation.

Among the six loops shown in FIG. 13, the inner loops from the third loop to the sixth loop may be unfolded.

First, by unrolling (or expanding) loops 3 through 6, a balance can be achieved between data processing and data generation. This suppresses idle time from occurring in the subsequent layer regardless of the filter size and the number of kernels in the subsequent layer. By unrolling (or expanding) all loops in this way, all input windows created in the line buffer can be performed simultaneously, resulting in significantly reduced time delay.

Additionally, loop 2 can be unrolled to examine hardware utilization. Unrolling loop 2 can be achieved simply by increasing the number of windows generated every clock cycle from the line buffer and duplicating the operation of the MAC block.

2) MAC Operation

As described in Section II above, it is very effective to utilize the weight reuse technique to optimize the pop-count instruction execution. The weight reuse technique can utilize graph partitioning and Hamiltonian's shortest path algorithm. For the Hamiltonian shortest path, it is an easy method to increase the number of weight reuse operations. However, for a convolutional layer containing many channels, the above technique requires a large number of flip-flops and significantly increases the delay. In general, using a Hamiltonian path makes the output of each channel depend on the output of the previous channel except the first output. As a result, many registers have to be added to synchronize with subsequent layers, which increases the initial delay and requires more hardware resources. For example, when a Hamiltonian graph is applied to K output channels, the number of flip-flops used for synchronization is determined by the following equation.

$$K \times \left[\frac{K}{m} - 1\right] \times bitwidth \qquad \text{[Equation 14]}$$

Here, m is the number of output channels calculated within the same clock period, and bitwidth is the width of data used to store the output of the pop-count command operation.

The above-mentioned disadvantage will be described with reference to FIG. 14a.

Figure 14A:
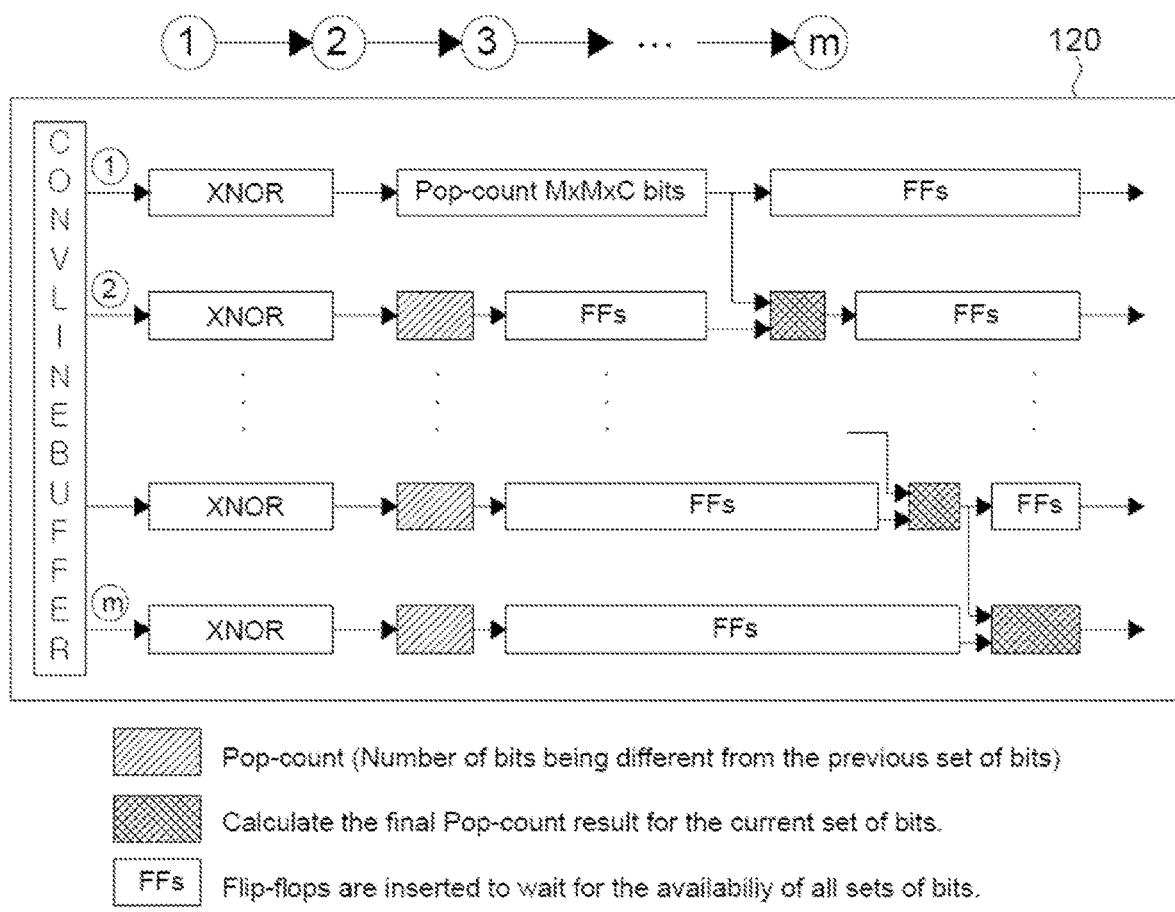
FIGS. 14A and 14B are schematic diagrams illustrating different mechanisms when using two techniques, that is, a Hamiltonian shortest path technique and a K-means cluster technique.
Figure 14B:
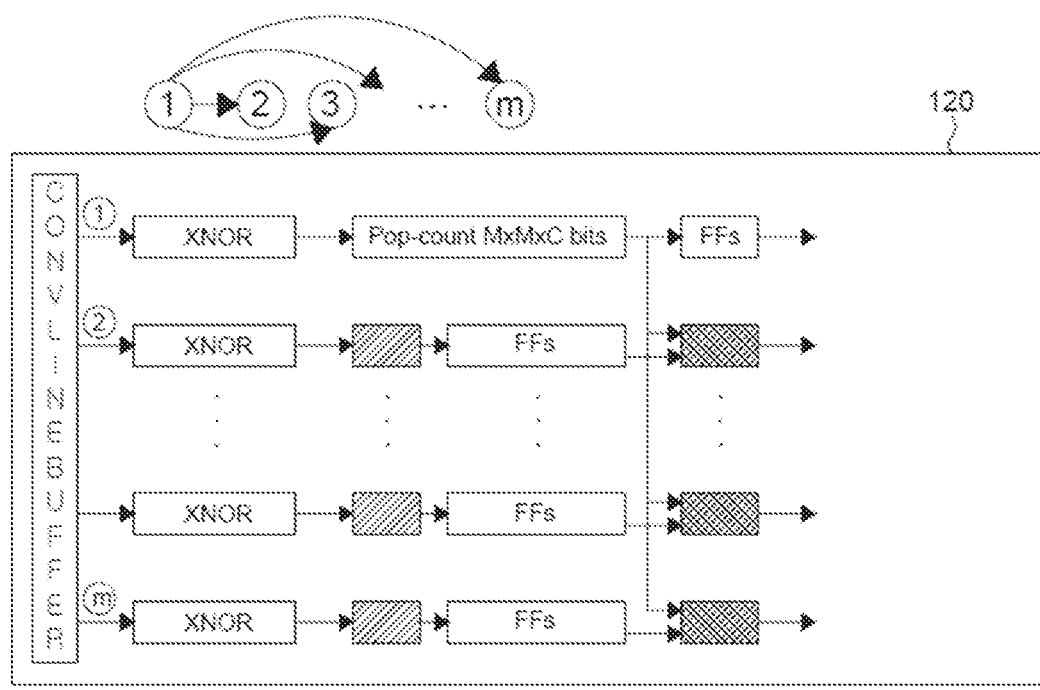

FIGS. 14a and 14b are schematic diagrams illustrating different mechanisms when using two techniques, that is, a Hamiltonian shortest path technique and a K-means cluster technique.

Specifically, FIG. 14A is a schematic diagram illustrating sequential processes of performing an XNOR operation and a pop-count instruction in the second block 120 for a convolution layer when using a Hamiltonian shortest path technique, and FIG. 14b is a schematic diagram illustrating a process of simultaneously performing the XNOR operation and the pop-count instruction in the second block 120 for the convolution layer when the K-mean cluster technique is used.

Since an algorithm for finding the Hamiltonian shortest path practically does not exist, considering the number of vertices, it is very interesting to investigate this matter. For example, the study of finding the Hamiltonian shortest path for a fully connected graph with N vertices is worth the challenge.

Two discussions are underway to find the shortest Hamiltonian cycle to find the Hamiltonian shortest path. The first discussion is the "exact solution" used to accurately find the shortest Hamiltonian cycle by reducing the number of searches for the Hamiltonian cycle. However, the "exact solution" consumes a lot of time and effort in calculating the final result for a large graph. In general, as the number of vertices increases, the processing time increases with an exponential power, e.g., $N^2 2^N$. The second discussion is an approximation algorithm that is more common for large graphs.

In order to solve the above problem, a partitioning technique that divides the entire graph into a small number of sub-graphs has been discussed. The number of vertices in the sub-graph is limited to 64. However, this has the disadvantage of increasing the number of output channels implemented in the hardware design. Furthermore, the number of sub-graphs depends on the limited number of vertices (i.e., 64) in the sub-graph. Therefore, as the number of output channels increases, more hardware resources are required to implement the output channels and increase the power consumption.

Therefore, an example of the present disclosure similarly uses a graph, but suggests an alternative way for improvement. According to the proposed scheme, it is assumed that each set of (M×M×C) binary weight values represent a vertex, and the number of bits different between the two sets is the distance of the edge connecting the two vertices.

In order to partition the graph, a K-mean cluster algorithm can be used for every R (i.e., the number of output channels) from 1 to K. The optimal R value gives the smallest number of binarized bits used to produce the result of all output channels. This allows all repeating binarized bits to be removed. The proposed method uses a K-mean cluster. This is shown in FIG. 14B. The equation for finding the optimal R value is as follows.

$$R = \operatorname*{argmin}_{R}\left(\sum_{i=1}^{R}\sum_{j=1}^{m_i} Dist_{ij} + R \times C \times M \times M\right) \quad \text{[Equation 15]}$$

where R is the number of sub-graphs, mi represents the number of vertices with the same center, $Dist_{ij}$ is the distance connecting the center point i and the vertex j, and (R×C×M×M) represents the total number of bits in the R output channels. In the proposed method, a K-mean cluster is used to find the R group of vertices and corresponding centroids.

Theoretically, the output of the K-mean cluster algorithm contains R sub-graphs. where R denotes the initial R centroid and the corresponding centroids based on the coordinates of all vertices. In the first process, each vertex is grouped so that the distance from each vertex to the center of the group is the shortest. In the second process, the center of a new group in each group of vertices is selected through the following equation.

$$M_i = \Sigma_{j=1}^{m_i} x_j / m_i \quad \text{[Equation 16]}$$

where $M_i$ and $x_j$ are the center of the $i^{th}$ group and $j^{th}$ vertex coordinates. The above two steps can be repeated so that the sum of all distances from all vertices to the center is minimized. However, the distance between any two vertices may be valid information. Therefore, in the second process above, only the vertex having the shortest sum of distances to all vertices in the group can be selected.

On the other hand, the K-mean cluster has the following limitations: Different R initial centroids make the partitioning method different. On the other hand, calculating all of the other R initial center points and R values from 1 to K (i.e., the number of output channels) wastes a very long time when the number of output channels is a large layer. For example, when a layer includes K output channels, the total number of cases to be analyzed is as follows.

$$\text{Number\_of\_cases} = \sum_{i=1}^{K-1} C_K^i = 2^K - 2. \quad \text{[Equation 17]}$$

When the number of search cases is 100,000 or more, in order to reduce the number of cases, K-mean++ for initializing the first R centroid may be used. In addition, in order to make the output result more accurate, the second centroid for the number of all cases is computed, and an optimal value can be selected. In addition, when one layer has K output channels and the number of clusters varies from 1 to K, the total number of cases may be $K^2$ smaller than the number of cases (i.e., $2^K-2$) when using the basic K-mean algorithm (here K>5).

3) MAC Compression

Figure 15:
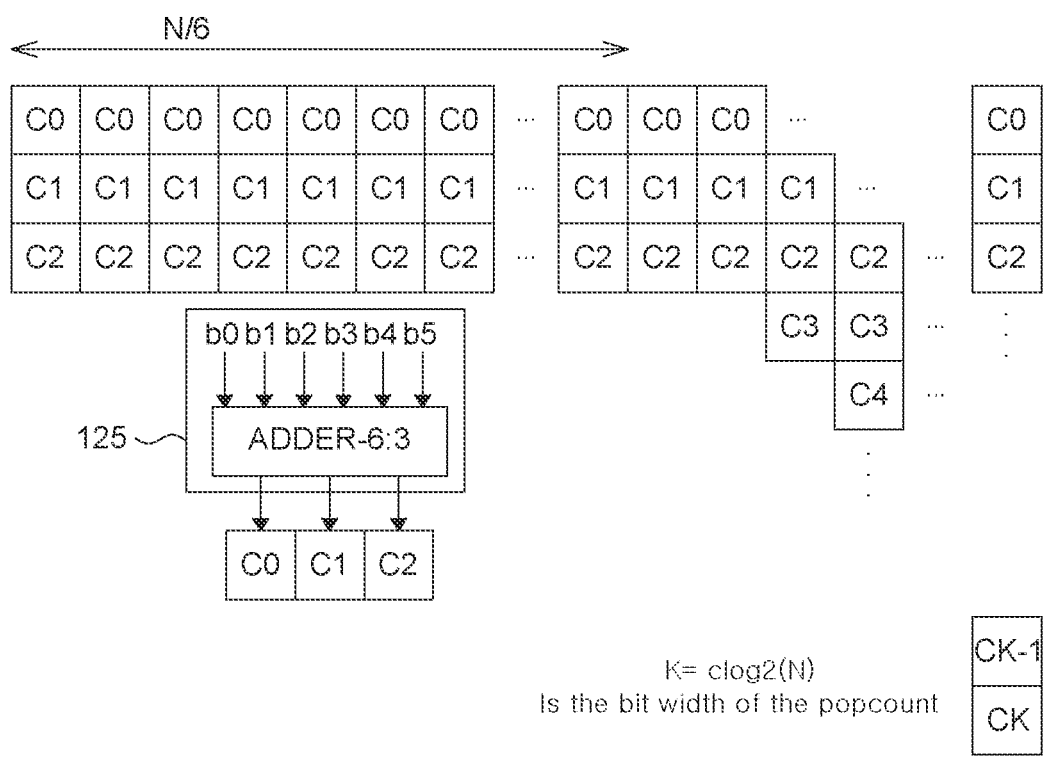
FIG. 15 is a schematic graph illustrating pop-count compression of a 6:3 adder.
Figure 16:
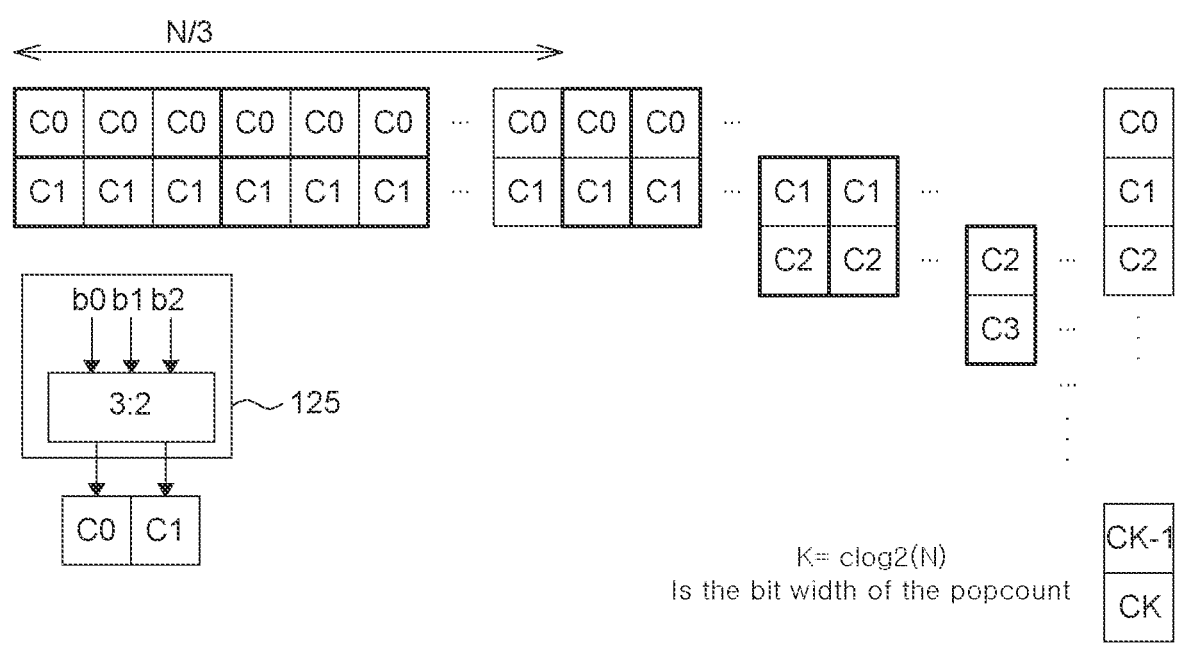
FIG. 16 is a schematic graph showing pop-count compression of a 3:2 adder.
Figure 17:
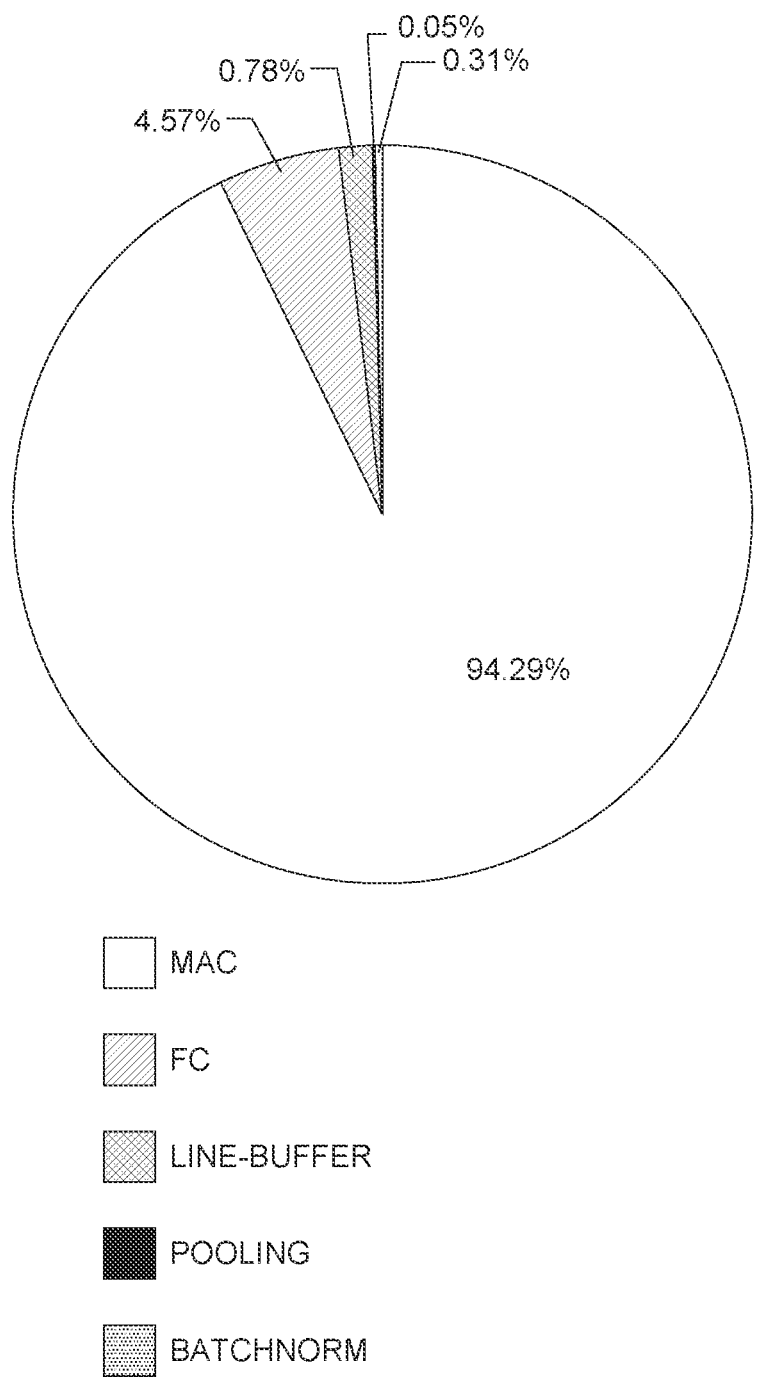
FIG. 17 is a schematic graph showing the power consumption ratio of the BNN architecture proposed in the present disclosure as a percentage when using the Cifar-10 data set.
Figure 18:
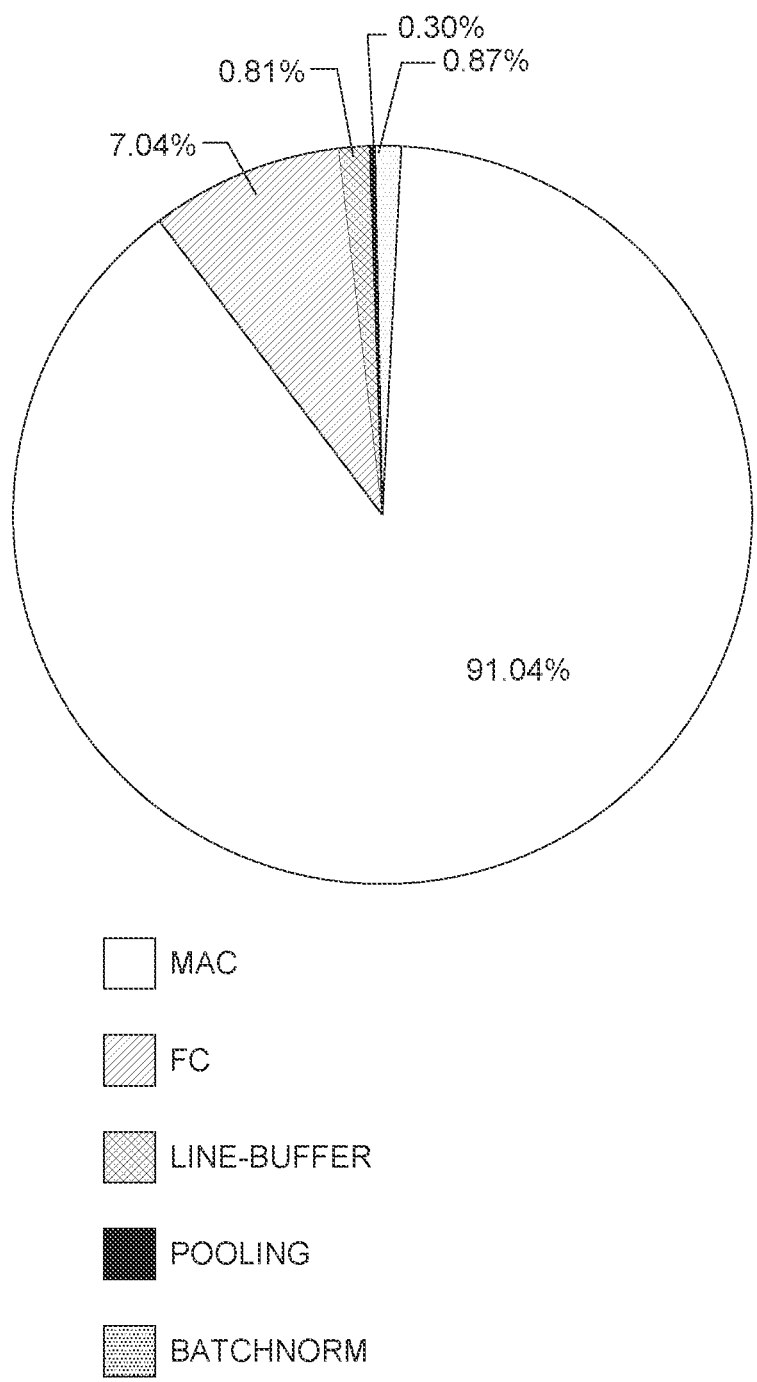
FIG. 18 is a schematic graph showing the area of the BNN architecture proposed in the present disclosure as a usage ratio in the case of using the Cifar-10 data set.

FIG. 15 is a graph illustrating pop-count compression of a 6:3 adder. FIG. 16 is a graph showing pop-count compression of a 3:2 adder. FIG. 17 is a graph showing the power consumption ratio e of the BNN architecture proposed in the present disclosure as a percentage when using the Cifar-10 data set. FIG. 18 is a graph showing the area of the BNN architecture proposed in the present disclosure as a usage ratio in the case of using the Cifar-10 data set.

In order to further optimize the MAC operation consuming most of the hardware resources and power in the BNN architecture as shown in FIGS. 17 and 18, two techniques using compression in the pop-count command may be applied. First, as shown in FIG. 15, 6:3 compression may be applied by adding a 6:3 adder to the adder tree 125 in order to reduce the number of LUTs. Each bit of the output result from the least significant bit (LSB) to the most significant bit (MSB) can be sequentially calculated using a 6:3 adder. In this way, too many bits can be prevented from being input to the adder and hardware resources can be saved. Similarly, in an automated hardware implementation, a 3:2 adder compression may be provided within the adder tree 125 as shown in FIG. 16.

Based on the input bit width of the pop-count instruction operation, 3:2 compression and 6:3 compression can be selected and applied to the adder tree. The table below shows that 3:2 compression only uses some resources (7.5% LUTs for the MNIST model and 9.5% LUTs for the Cifar-10 model) and 6:3 compression consumes less power (6.7% for the MNIST model and 11.5% for the Cifar-10 model) in both models.

Table 5 below shows hardware resources and power consumption when three options (no compression, 3:2 compression, and 6:3 compression) are applied to the adder tree.

TABLE 5

| Number of windows = 1 | | Look up table | Flip-flops | Power |
| --- | --- | --- | --- | --- |
| MNIST (100 MHz) | Non-compress | 10,527 | 5,923 | 0.428 |
| | Compress 3:2 | 9,740 | 5,723 | 0.413 |
| | Compress 6:3 | 10,310 | 5,720 | 0.399 |
| CIFAR-10 (50 MHz) | Non-compress | 311,546 | 38,571 | 6.598 |
| | Compress 3:2 | 281,861 | 38,566 | 6.256 |
| | Compress 6:3 | 290,600 | 38,530 | 5.837 |

Figure 19A:
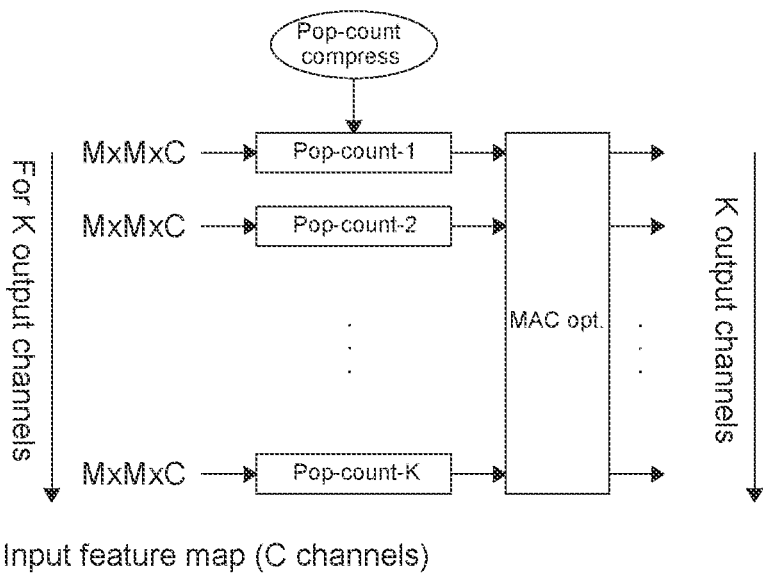
FIG. 19A shows a MAC operation process when there is no reuse of a pop-count command.
Figure 19B:
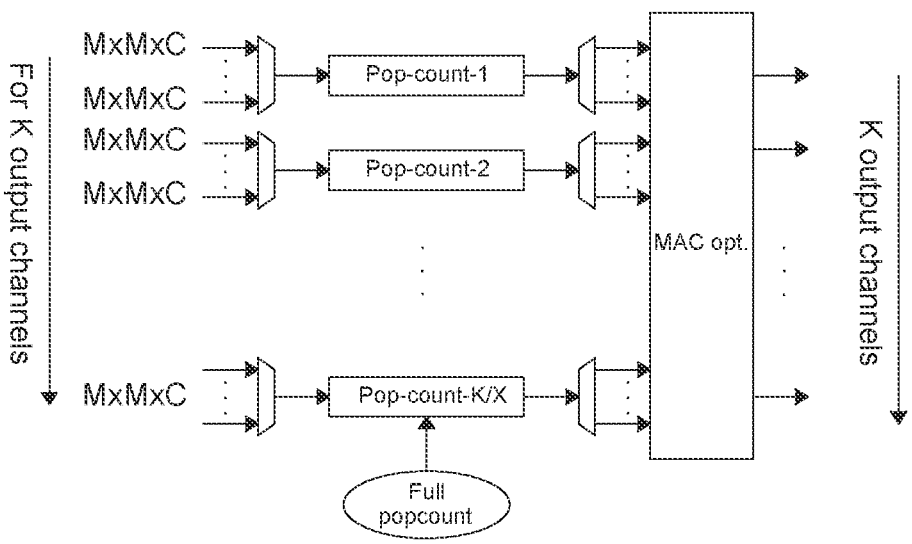
FIG. 19B shows a MAC operation process when a pop-count command is reused.

FIG. 19A shows a MAC operation process when there is no reuse of a pop-count command, and FIG. 19B shows a MAC operation process when a pop-count command is reused.

An example of the present disclosure proposes a reuse technique of a pop-count instruction in order to significantly save hardware resources.

If the pop-count command is not reused as shown in FIG. 19A, the execution of K pop-count commands for K output channels can be implemented, whereas the pop-count command is reused as shown in FIG. 19B. In this case, the execution of the pop-count command can be reduced to X times, where X is the number of output channels using the same pop-count command.

To maintain the sustainability of the streaming architecture, a clock source using the pop-count instruction can be X times faster than a clock source using another. The value of X may be determined based on the required performance. Increasing the value of X degrades hardware overhead and performance. On the other hand, if X is reduced, hardware overhead and performance may increase.

III-4. Architecture's Running Time

As described in Section III-1, the architectural design proposed in this specification is a structure having a pipeline stage equal to the number of layers. By overlapping steps, performance and initial pipeline filling time can be dramatically improved. In particular, a convolution line buffer (CLB) of a specific layer may generate window values after a clock cycle according to the following equation.

$$N_f = E * \left(M - \left\lfloor \frac{M}{2} \right\rfloor - 1\right) + \left\lfloor \frac{M}{2} \right\rfloor + N \quad \text{[Equation 18]}$$

Moreover, by unwinding the loop (or expanding or unrolling) and applying the pipeline, the multiplication and pop-count instruction execution module may only require a typical number of clock cycles (i.e., Np). Based on the number of output channels and the input bit width, the number of clock cycles can be modified to have the highest frequency and to meet the timing requirements. Accordingly, as shown in FIG. 20, an operation of a subsequent layer may be performed after an $N_f+N_p$ clock cycle that is later than the start time of a specific layer.

Figure 20:
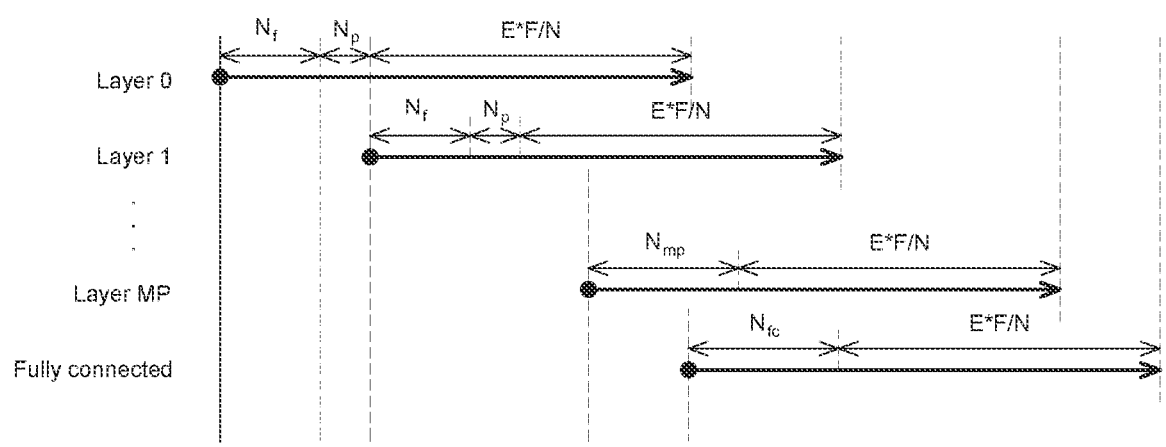
FIG. 20 is a schematic diagram illustrating a processing time of the architecture proposed in the present disclosure.

FIG. 20 is a schematic diagram illustrating a processing time of the architecture proposed in the present disclosure.

For each pooling layer, E+N clock cycles may be needed to produce an output (window size is 2×2, number of simultaneous inputs is N). Therefore, the subsequent convolutional layer should wait for E+N cycles after the current pooling layer. In terms of fully connected layers, $N_{fc}$ clock cycles are required to receive the first data and generate a second temporary maximum value of 10 output channels. The number of clock cycles may be flexibly changed according to a required frequency. In particular, in an experiment using a frequency of 300 MHz, it was confirmed that the fully connected layer requires 3 clock cycles to find the maximum value from 10 temporary output values.

Since the input data are continuously filled in the proposed BNN hardware accelerator (i.e., NPU), when loop 2 is not unrolled, the sum of the initial time delays in all layers (convolutional layer, pooling layer, and fully connected layer) may be determined by E*F clock cycles in order to process one inference operation. For the case of not unrolling loop 2, the number of clock cycles required can be reduced by N times (where N is the number of windows in the CLB). Consequently, (E×F/N) clock cycles are required to classify one input image.

IV. EXPERIMENT RESULT

IV-1. BNN Model Analysis

In order to explore the potential model architecture space, to obtain the optimal BNN model, and to make the software model compatible with the proposed optimization technique with improved accuracy, some learning conditions are required for all models. In particular, a batch-normalization operation is added after each convolutional layer, and the maximum pooling layer may be placed after the batch-normalization operation of the second convolutional layer. For models using the MNIST data set, the binary search can be a layer. The initial input for performing training on the MNIST data set may be as follows.

1) The range of the number of layers in the BNN model: L={3; 4; 5}
2) Maximum number of channels per layer: Ci≤50
3) Target accuracy threshold Until a BNN model with the minimum number of channels is found for all layers, a binary search can be used for each L value to reduce the number of channels in each layer uniformly based on the above three inputs. Next, binary search can be continuously used to minimize the number of channels for each particular layer based on the above model.

As a result, an optimal BNN model corresponding to a specific L value can be determined. Each model may have a variable number of layers represented by elements of the set L. Therefore, the number of output models is expressed as the size of the set L. Moreover, in each initial BNN model, if only the number of channels in each layer is optimized, all components of the network architecture can be independently predefined to reduce the search space. In terms of the learning environment, a productive optimizer using the adaptive moment estimation (Adam) optimizer for the first 30 epochs and the stochastic gradient descent (SGD) optimizer for the remaining 70 epochs can be utilized. Here, the learning rate may be set to 0.03 and the momentum to 0.5 may be set.

For models using the Cifar-10 dataset, some training conditions can be changed based on the model structure to be compatible with the proposed hardware architecture. In particular, padding may be added with a value of −1 for each convolutional layer to improve the accuracy with only a smaller number of channels. In addition, the output feature map of the last convolutional layer is guaranteed to be 1×1 dimension, which makes it possible to apply the MAC optimization method to the fully connected layer. For a training environment, the Adam optimizer can be used with 500 epochs. The learning rate was 0.005 for the first 40 epochs, 0.0001 for the 80th epoch, 5e-05 (or 5*10^−5) for the 120th epoch, and 5e-06 (or 5*10^−6) for the 160th epoch.

The present disclosure finds one model for the Cifar-10 data set and two models for the MNIST data set using the aforementioned approach. The first model is for the Cifar-10 data set. Using these models, the effectiveness of the proposed architecture can be demonstrated. First, for the MNIST data set, the BNN model can be simplified in terms of hardware implementation when the target accuracy is set to 98.4% or higher in the first model optimization for MNIST. This model can be defined as MD1. On the other hand, as a result of exploring many BNN models with various configurations to find a very efficient BNN model with reasonable accuracy in hardware implementation, an efficient second model with an accuracy of 97.7% was found. This second model is defined as MD2.

As a result of performing the architecture search, two optimal models were found for the two respective accuracy thresholds of 98.4% and 97.7%. For the model for 98.4%, according to Table 6, it can be seen that the model with three convolutional layers has the shortest inference latency compared to other models with the same accuracy because the model has the smallest number of layers. Also, it can be seen that this three-layer model shows the best results in terms of hardware resources. Therefore, this model can be selected as the MD1 model.

Similarly, the MD2 model can be found among many candidates with similar accuracy by considering the required hardware resources and the corresponding accuracy. In summary, both models have 3 convolutional layers and 1 fully connected layer. The MD1 model contains 26 channels for the first convolutional layer, 24 channels for the second layer, and 31 channels for the last convolutional layer. The MD2 model has 17 channels for the first convolutional layer, 15 channels for the second layer, and 22 channels for the last convolutional layer. A batch-normalization function is applied after each convolutional layer of the two models, and max-pooling can be applied to the last two convolutional layers.

Finally, as mentioned above, both models use 16-bit fixed-point input pixels and binary weights for the first convolution. The weights and input feature maps are binarized in the second layer. Second, in the case of Cifar-10, a model with an accuracy of 80.2% was found. Here, six convolutional layers (size 64, size 96, size 96, size 128, size 192) and two fully connected layers (size 256, size 10) may be disposed at the end. A max-pooling layer can be added after connecting a batch-normalization operation after each layer and performing the batch-normalization operation from the second convolutional layer to the last convolutional layer.

TABLE 6

| | Output channels | | |
| Layer | 5 Layers | 4 Layers | 3 Layers |
| --- | --- | --- | --- |
| 1 | 19 | 24 | 26 |
| 2 | 20 | 22 | 24 |
| 3 | 20 | 23 | 31 |
| 4 | 20 | 22 | |
| 5 | 19 | | |
| LUTs | 19,954 | 21737 | 19211 |
| Flip-flops | 10026 | 9830 | 9104 |

Table 6 above compares hardware resource usage between the optimal models.

IV-2. Automated Hardware Implementation and Validation Process

Needless to say, designing a hardware accelerator (i.e., NPU) for each model is time consuming, labor intensive and error prone.

Figure 21:
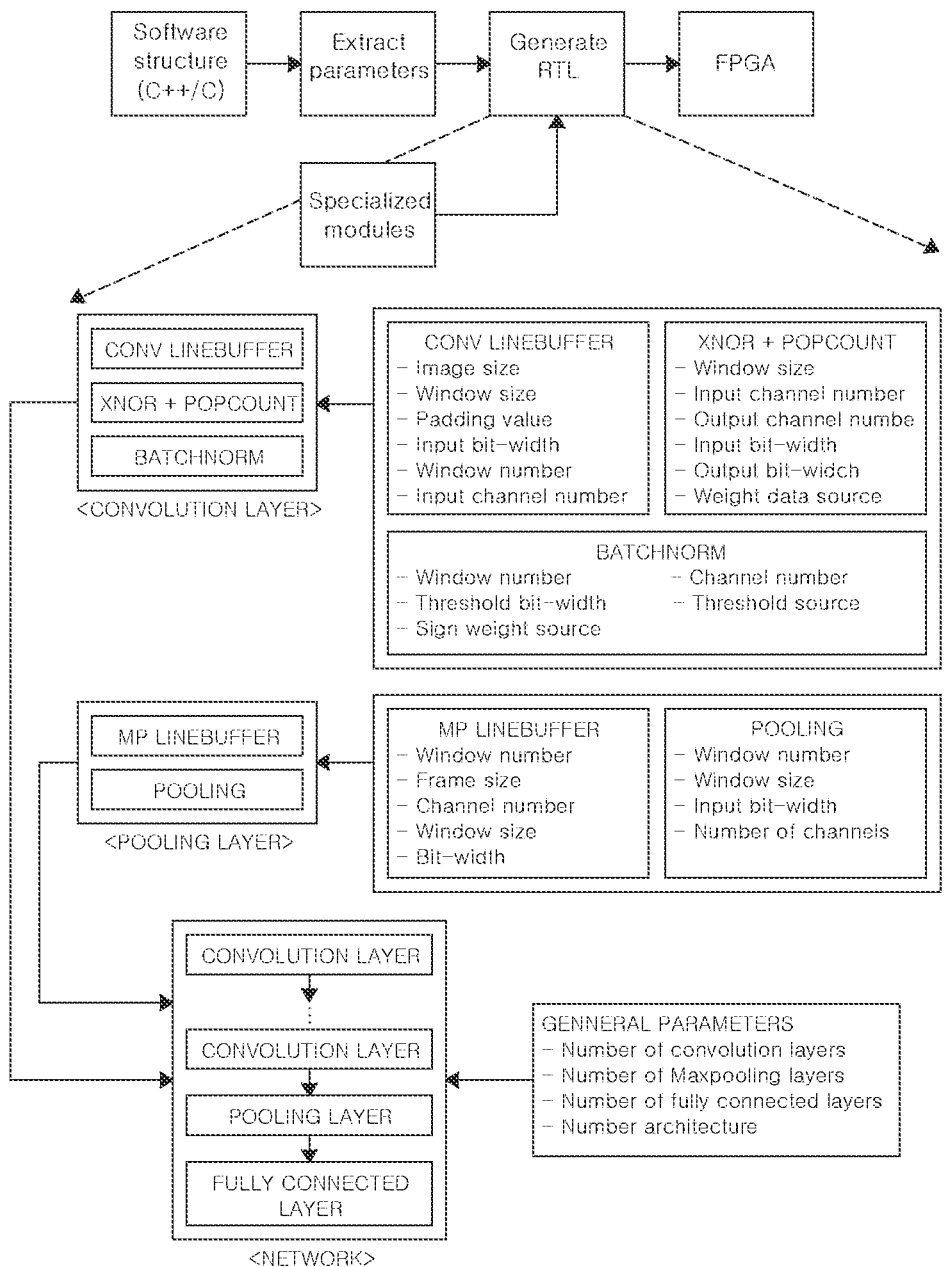
FIG. 21 is a schematic flowchart illustrating an automated implementation process of hardware based on special modules and parameter extraction.

FIG. 21 is a schematic flowchart illustrating an automated implementation process of hardware based on special modules and parameter extraction.

The present disclosure proposes a hardware implementation framework that automates the hardware architecture creation at the register transfer level (RTL) based on user constraints on the BNN model. Scripts can be used to automatically generate RTL designs according to user-specified constraints.

All parameters are divided into two sets (a set of module parameters and a set of general parameters). The proposed hardware architecture may include hardware modules specialized for general functions such as batch-normalization, CLB, multiplication, pop-count instructions, PLB, pooling and the like.

To create an RTL design, a generic structure (a schematic structure) can first be defined based on a script using a set of generic parameters. Here, the design may be determined according to the number and location of specific modules.

Next, module parameter sets can be used to set all input module parameters for each generic module at a specific location in the architecture.

Finally, all configured hardware modules can be connected via script to automatically generate the entire RTL design. In FIG. 21, all parameters of each module are described and a general parameter set is shown.

Figure 22:
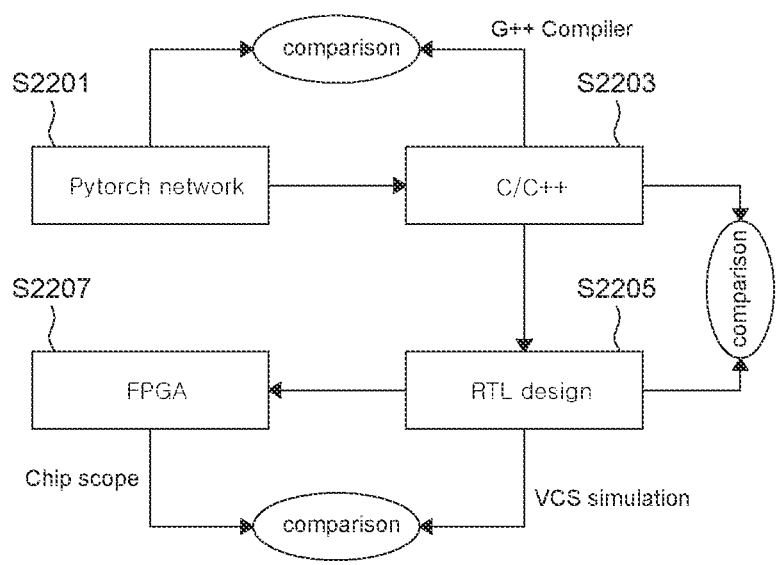
FIG. 22 is a schematic flowchart illustrating a verification process of a hardware implementation.

FIG. 22 is a schematic flowchart illustrating a verification process of a hardware implementation.

As can be seen with reference to FIG. 22, in order to verify that the BNN model and the implemented hardware accelerator are equivalent to each other in the software implementation, the proposed architecture was verified for various BNN models with various layers, channels, and the accuracy.

First, the C/C++ model is created based on the parameters and model structure of the PyTorch model S2201. Each layer of the PyTorch model is created as a C/C++ function S2203. The output of each layer can be compared between the C/C++ model and the PyTorch model. After creating the C/C++ model, a series of C/C++ models corresponding to different channels and number of layers were prepared.

Second, each hardware accelerator is implemented with an automatic script S2205. Next, using Synopsys™' VCS simulation tool, the waveform of each data path is precisely verified by comparing the results with the corresponding C/C++ model.

Finally, the implemented accelerator is ported to the FPGA S2207, and the operation of the hardware accelerator is verified using the C/C++ model. The VCS simulation results were verified bit by bit in the data path through the integrated logic analyzer (ILA) provided by Xilinx™ FPGAs.

After training using this automated process, hardware accelerators corresponding to the updated software model can be implemented immediately. As a result, manual labor can be eliminated from the hardware design stage to the verification stage for the target application.

IV-3. Hardware Implementation Experiment

To evaluate all model features, based on the proposed hardware architecture, input BNN model structure, and user-specified design parameters, an RTL specification sheet is generated using an automation script. Regarding the hardware device, the proposed architecture was implemented on Xilinx™'s Ultra96 evaluation board with Ultrascale+ MPSoC. In particular, a quad-core Arm Cortex-A53 application processing unit (APU) and a dual-core Arm Cortex-R5 real-time processing unit are mounted on the process subsystem (PS). The programmable logic (PL) component consists of 141,120 flip-flops, 70,560 look-up tables (LUTs), 360 DSP slices, and a 7.6 Mbits block of RAM.

As described above, simulations were performed on the RTL design generated using Synopsys VCS, and the image classification results were compared with the output of the bit-true C++ model for the input BNN model. In the next step, the proposed design was synthesized and implemented using Vivado™ 2018.3. All experimental results describing the number of LUTs, the number of flip-flops and the expected power consumption were collected in Vivado's report. In particular, in order to estimate the power efficiency of the BNN core, the power consumption was collected only from the PL part of the chip composed of FPGA logic gates.

steadily increases with the clock frequency for all loop-2 unrolling levels. This indicates that for the proposed architecture, the image classification speed increases faster than the increase in power consumption, resulting in better power efficiency at higher frequencies.

TABLE 7

| Model | Accuracy | HW indices | Number of windows = 1 [A] (FPS = 3.83 × 10$^5$ [B]) | | Number of windows = 2 [A] (FPS = 7.65 × 10$^5$ [B]) | | Number of windows = 4 [A] (FPS = 1.53 × 10$^6$ [B]) | |
|---|---|---|---|---|---|---|---|---|
| | | | No reuse weight | Reuse weight | No reuse weight | Reuse weight | No reuse weight | Reuse weight |
| MD1 | 98.40 | LUTs | 19,211 | 10503 (54.67%) | 28,534 | 15,460 (43.63%) | 54,595 | 29,156 (53.4%) |
| | | FFs | 9,104 | 6,023 (66.16%) | 12,910 | 8,795 (68.12%) | 23,080 | 15,341 (66.4%) |
| | | Power (W) | 1.126 | 0.676 (60%) | 1.671 | 0.973 (58.22%) | 3.332 | 1.735 (52.07%) |
| MD2 | 97.70 | LUTs | 10,891 | 6144 (56.4%) | 15,470 | 8,370 (54.1%) | 29,115 | 15,529 (53.34%) |
| | | FFs | 6,394 | 4516 (70.6%) | 8,795 | 5,961 (67.77%) | 15,404 | 10,058 (65.3%) |
| | | Power (W) | 0.705 | 0.47 (66.67%) | 0.965 | 0.607 (62.9%) | 1.725 | 0.938 (54.4%) |

[A] The number of windows is the number of windows generated by the CLB of the first convolution layer.
[B] If the the number of windows increases N times, the frame per second (FPS) also increases N times.

The software-based model and the implemented hardware accelerator were compared bit by bit. In particular, the functionality of the FPGA bitstream was fully verified against 10,000 images in the data set. On the PS side, the host C code running on the ARM processor contains two tasks. First, set up and run direct memory access (DMA) to transfer the test image frame by frame from DRAM to the hardware accelerator, and transfer the classification result from a hardware accelerator back to DRAM. Next, all classification results received after the arrival of the last result are compared with the known output of the C/C++ model.

Figure 23:
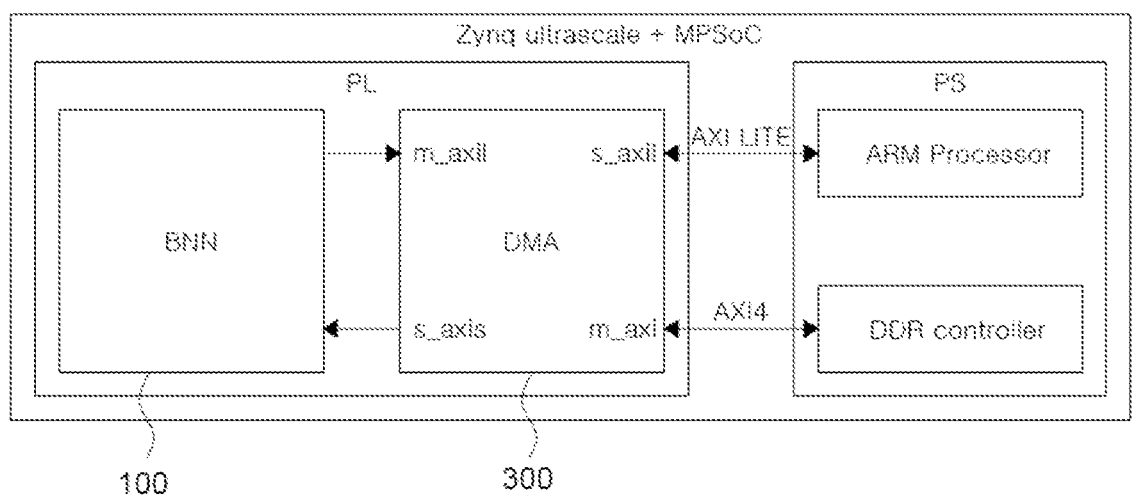
FIG. 23 is a schematic diagram illustrating an example of a system architecture for BNN.

FIG. 23 is an exemplary diagram illustrating an example of a system architecture for BNN.

FIG. 23 shows a programmable logic (PL) and a processing system (PS).

The PL includes a BNN dedicated accelerator (i.e., a BNN dedicated NPU) 100 and a DMA 300.

The PS includes an ARM processor and a DDR controller. The PS may be connected to a BNN dedicated accelerator (i.e., a BNN dedicated NPU) 100 through the DMA 300. The DDR controller may communicate with the DMA 300 through the AXI-4 bus, while the ARM processor may communicate with the DMA through the AXI-Lite bus.

IV-4. Experimental Evaluation

To estimate the efficiency of the proposed architecture, a series of experiments corresponding to various parameter sets and goals were performed. In particular, five factors were investigated: clock speed, release level of loop 2, MAC optimization method, MAC compression method, and classification accuracy.

Figure 24:
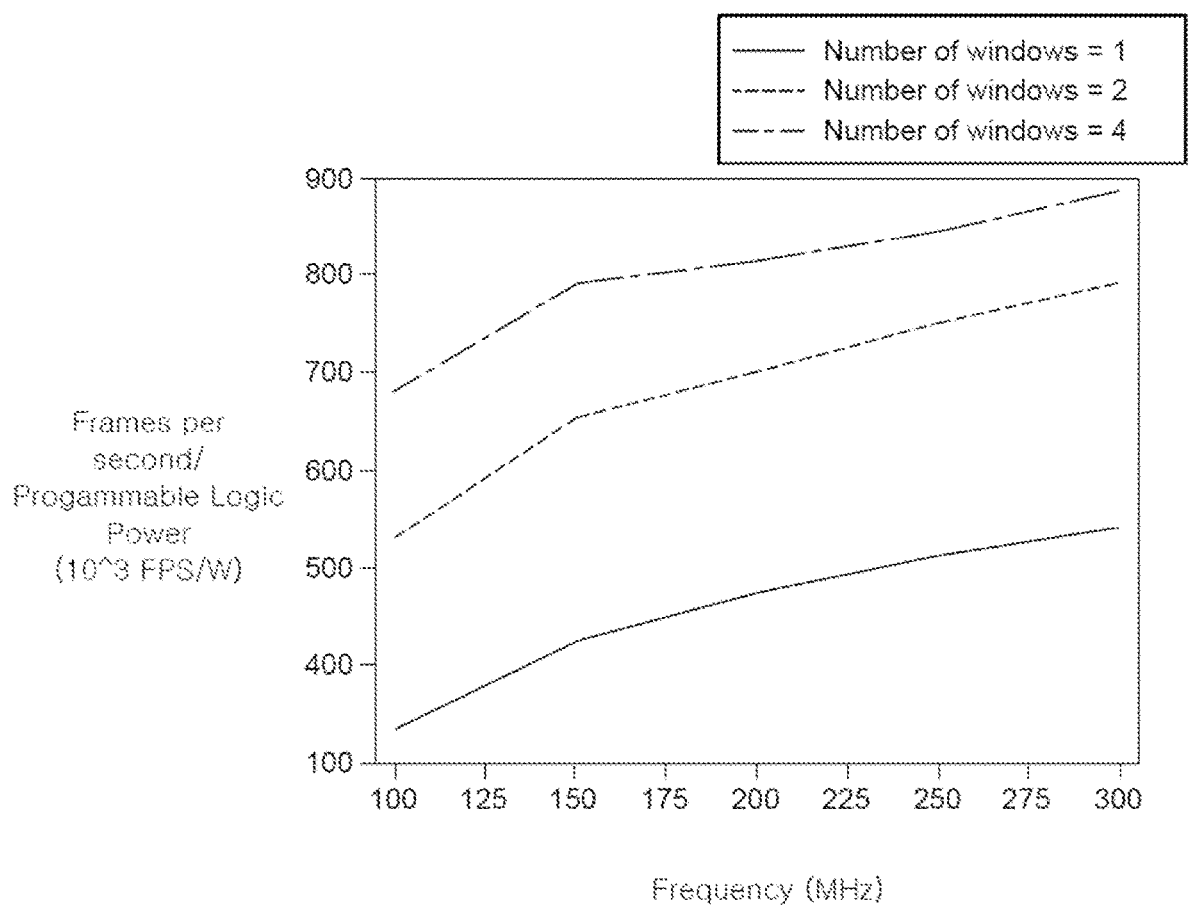
FIG. 24 is a schematic graph illustrating power efficiency and frequency effects in the situation with the release of loop 2.

FIG. 24 is an exemplary graph illustrating power efficiency and frequency effects in the situation with the release of loop 2.

First, MD1 models were synthesized with different frequency values of 100, 150, 200, 250 and 300 MHz. Checking the results shows that the hardware resources are not completely affected by the operating frequency. In contrast, frame rates (or frames per second) increase the power consumption of hardware implementations. Specifically, according to FIG. 24, it is worth noting that the FPS/W ratio The table above shows the effect of loop release, accuracy, and weight reuse method by hardware index. The frequency is 300 MHz.

Second, the same MD1s with different values of N: 1, 2, and 4 were also synthesized to study the effect of the loop 2 release factor. An N-fold increase also increases the overall system throughput by an N-fold. For N=1, the frame rate of the accelerator is $3.83 \times 10^5$, and for N=2 and N=4, the frame rate increases to $7.65 \times 10^5$ and $1.53 \times 10^6$, respectively. On the other hand, according to the results of Table 7, when N>1, hardware resources and power consumption increase much less than N times compared to N=1. In general, the number of LUTs (Look-up Tables) used for MD1 with N=1 without weight reuse is 19,211, whereas the number used for N=2 is 28,534 (1.48×), and the number used for N=4 is 54,595 (2.8×). The use of flip-flops (FF) gives an impressive number when compared to N=1. For N=2, it is 12,910 (1.42×), and for N=4, it is 23,080 (2.53×). In MD2, similar results were obtained regardless of whether or not weights were reused.

For power evaluation, FIG. 24 shows the efficiency improvement when increasing the value of N for the MD1 model with weight reuse enabled. According to the graph shown, if N is increased from 1 to 4, the FPS/W ratio is doubled. Moreover, the graph shown indicates that the higher the degree of parallelism, the better the power efficiency without changing the frequency. Therefore, the proposed architecture maximizes the frequency and parallel level to obtain the highest efficiency.

Next, in order to confirm the effect of applying the MAC optimization method, both MD1 and MD2 models with or without weight reuse were synthesized and tested at 300 MHz. The results in Table 7 show that hardware resources and power consumption are significantly reduced when kernel weights are reused to eliminate redundant calculations. In general, when MAC optimization method is enabled, the number of LUTs is in a range from 53% to 56% compared to designs without MAC optimization, on the other hand, the number of FFs is reduced from about 30% to 35% and the power consumption is also reduced to about 35% to 48% depending on the model size and the level of loop unrolling. On the other hand, if the results are analyzed in the horizontal direction (same model, different number of windows) and in the vertical direction (the N values are the same but the model sizes are different): (i) hardware resource and power consumption improvements tend to be higher for models with more channels and (ii) the same trends when increasing the level of parallelism.

In terms of the correlation between MD1 and MD2, the amount of LUT used in MD2 is between 1.7 and 1.9 times less than that required in MD1 for other values of N, and the FF usage and power consumption are also reduced by 1.3-1.5 times and 1.4-1.9 times. The classification accuracy is reduced to a small extent of only 0.7%. In order to find an optimal solution, a level of accuracy that produces an appropriately efficient hardware implementation can be defined.

After all investigations, it can be concluded that for a model with a certain accuracy, the proposed architecture can be utilized most effectively by running at the highest frequency and parallelism level.

IV-5. Comparison with the Conventional Art

In this section, the most desirable results of the proposed architecture are compared with the conventional arts using both the MNIST and Cifar-10 data sets. In the case of the MNIST data set, two models MD1 and MD2 implemented with the MAC optimization method along with pop-count compression, or without pop-count compression were selected and shown in Table 8 in comparison with the conventional arts. The results confirm that the pop-count compression method at 300 MHz can make the design smaller with fewer LUTs and FFs. However, power consumption was found to be higher compared to the model implemented without pop-count compression. The energy difference with and without pop-count compression is reduced for models with low or large frequencies.

fewer hardware resources. BNN-PYNQ is the latest version of FINN among Xilinx™'s open-source projects published on GitHub. For comparison, the project was downloaded and synthesized to reproduce using the mentioned hardware. This model has the same accuracy as FINN, but the architecture includes four fully connected layers. In addition, compared to FINN, this model uses significantly less resources but offers much lower performance (FPS=356.6 k FPS). The FP-BNN model also uses four fully connected layers to classify the MNIST data set. The FP-BNN model uses Altera Intel™'s Stratix V and uses a compression tree to optimize the pop-count operation. The last chosen is Re-BNet, an improved version of FINN. This model shows efficiency when maintaining 98.29% accuracy and requires only hardware resources such as 25,600 LUTs, which is much smaller than the original FINN.

Table 8 shows all references and overall configuration and hardware implementation results of the two models presented in this disclosure. Hardware implementation based on the proposed architecture provides minimal area compared to all other work related to hardware utilization. Compared to BNN-PYNQ, which includes Xilinx™'s lightest architecture, the model presented in this disclosure, that is, the MD1 model with two windows consumes 1.84 times less LUT and also 3.77 times less FF, while it can have a frame rate 2.14 times higher and power consumption is 1.36 times lower. Even in the case of creating 4 windows, the model MD1 presented in the present disclosure used fewer resources than BNN-PYNQ, had slightly more LUTs and 2.1 times less FF, but still had a 4.3 times higher frame rate while maintaining the same accuracy.

Compared to the original FINN, the four-window MD1 used 3× fewer LUTs, yielding a frame rate of 98%. On the other hand, the smaller model MD2 can provide decent accuracy like the FINN-R, but uses 2.4× fewer LUTs and

TABLE 8

| Model | Accuracy | Platform | Freq. (MHz) | LUTs | FFs | BRAM | DSP | Framerate ($\times 10^3$ FPS) | Power (W) | GOP/s | Power eff. (FPS/W) |
|---|---|---|---|---|---|---|---|---|---|---|---|
| MD1[a] | 98.4% | Ultra96 | 300 | 15,460 | 8,795 | 0 | 0 | 765 | 1.004 | 18,330 | 761,952 |
| MD1[b] | 98.4% | Ultra96 | 300 | 14,096 | 8,923 | 0 | 0 | 765 | 0.973 | 18,330 | 786,228 |
| MD1[c] | 98.4% | Ultra96 | 300 | 29,156 | 15,404 | 0 | 0 | 1,530.6 | 1.735 | 18,330 | 882,190 |
| MD1[d] | 98.4% | Ultra96 | 300 | 26,780 | 15,238 | 0 | 0 | 1,530.6 | 1.795 | 18,330 | 852,702 |
| MD2[c] | 97.7% | Ultra96 | 300 | 15,529 | 10,058 | 0 | 0 | 1,530.6 | 0.938 | 7,647 | 1,631,769 |
| MD2[d] | 97.7% | Ultra96 | 300 | 14,361 | 10,513 | 0 | 0 | 1,530.6 | 0.977 | 7,647 | 1,566,623 |
| FINN | 98.4% | ZC706 | 200 | 82,988 | — | 14,256 | — | 1,561 | — | 9,086 | — |
| FINN-R | 97.69 | Ultra96 | 300 | 38,205 | — | 7,560 | — | 847.5 | — | 5,110 | — |
| BNN-PYNQ | 98.4 | Ultra96 | 300 | 26,809 | 30,947 | 3,960 | 4 | 356.6 | 1.334 | 2,150 | 267,342 |
| FP-BNN | 98.24% | Stratix V | 150 | — | — | 44,200 | 20 | — | — | 5,904 | — |
| Re-BNet | 98.29% | Spartan XC7S50 | 200 | 25,600 | 34,230 | 87 | 150 | 330 | — | — | — |

[a]The number of windows is two and without pop-count compression.
[b]The number of windows is two and with pop-count compression.
[c]The number of windows is four and without pop-count compression.
[d]The number of windows is four and with pop-count compression.

The table above shows the performance of the proposed architecture when using the MNIST data set compared to the previous one.

Using the MNIST data set and binary weights, five architectures were selected that provided competitive performance. The first chosen is FINN, which is a hardware implementation of BNN models. FINN implements an MLP model that contains three fully connected layers and takes a 28×28 binary image as input. FINN has the fastest image classification rate (1,561 k FPS) in the MNIST dataset. The second chosen is the reference FINN-R, which is a kind of MLP model. This model is less accurate, but uses much produces 1.8× higher frame rates when running at the same clock speed. Unlike all other architectures, both MD1 and MD2 were able to completely eliminate the use of on-chip memory devices and DSP slices, resulting in significant power consumption improvements. As described above, the power efficiency of the architecture presented herein can be maximized when both the clock speed and the loop unrolling level are increased. MD1 and MD2 using 4 windows at 300 MHz and N=4 can deliver 3.8× and 6.1× higher FPS/W, respectively, compared to BNN-PYNQ. Although not all listed in Table 8, both models can be configured with a lower value of N, provided that frame rate is not prioritized as high as hardware resources.

TABLE 9

| Cifar-10 | Freq (MHz) | LUTs | Acc (%) | kfp | Area (fos/luts) |
|---|---|---|---|---|---|
| Ours (X = 1) | 210 | 290.0 | 80.2 | 205 | 0.707 |
| Ours (X = 1) | 177 | 281.5 | 80.2 | 173 | 0.614 |
| Ours (X = 2) | 150 | 232.2 | 80 2 | 146 | 0.630 |
| Ours (X = 4) | 75 | 156.3 | 80.2 | 73 | 0.468 |
| FINN | 200 | 46.25 | 80.1 | 13 | 0.280 |
| FINN | 125 | 365.9 | 80 1 | 125 | 0.340 |
| FINN-R | 237 | 332.6 | 80.1 | 102 | 0.306 |
| FINN-R | 300 | 41.73 | 80.1 | 19. | 0.467 |
| FBNA | — | 26.90 | 88.6 | 0.5 | 0.02 |
| ReBNet | 200 | 53.20 | 80 5 | 6 | 0.11 |
| FINN- | 300 | 25.43 | 80.1 | 1.9 | 0.074 |

The above table shows the efficiency of the architecture presented in the present disclosure compared to the conventional art.

For the Cifar-10 data set, this section presents four architectures with different X values. When X=1, the proposed architecture can be implemented at 210 MHz and 177 MHz. Based on the results, it can be concluded that designing the architecture with the maximum frequency increases the area efficiency. When X=2, the frequency used for MAC operation is 300 MHz, and the rest operates at 150 MHz. At this time, compared to the case of X=1, the number of LUTs could be reduced from 18% to 20%. At X=4, the MAC operation continues at 300 MHz and the rest run at 75 MHz. Hardware overhead was reduced by 32% and 46% compared to X=2 and X=1, respectively. To evaluate the area efficiency, the proposed design was compared with the conventional art using the FPS/LUTs ratio as shown in Table 9. The proposed design could provide better area efficiency compared to all previous designs. In particular, it can be seen that the area efficiency of the proposed design when X=1 (0.707) is 1.5 times higher than that of the previous best design (0.467). In terms of performance, the proposed design could provide an ultra-fast frame rate of 205,000 frames per second.

In summary, based on the results of Tables 8 and 9, it can be seen that for the MNIST and Cifar-10 data sets, the design proposed in this disclosure can provide much higher power and area efficiency than previous work. The main reason is the successful application of several new optimization methods based on the capabilities of streaming and binary architectures. In particular, this is because, unlike the conventional designs compared in Tables 8 and 9, all XNOR logic gates are removed or replaced with NOT gates (smaller than XNOR). As a result, the memory that stores the weight kernel values can also be eliminated.

Therefore, in the design proposed in the present disclosure, the internal memory is 0 as shown in Table 8, whereas in the conventional design, a certain amount of memory (Block RAM, BRAM) is required. In addition, the design proposed in the present disclosure directly implements the MAC optimization method without additional resources. Also, in the proposed design, the line buffer does not store all the output feature maps, but only the data needed to provide it to the next layer. In this way, it uses much fewer hardware resources than the conventional design. In addition, the pipeline unrolling method maximizes the utilization of the max-pooling layer with line buffers that support various parallel levels, leading to the highest power and resource efficiency. More specifically, throughput can be increased by N times, but the required hardware overhead is much lower than N times. The last-mentioned MAC compression technique helps to save a significant amount of hardware resources without affecting the performance in the proposed design.

V. CONCLUSION

Equipped with small size parameters and low-cost computation, BNNs, as hardware accelerators, are suitable for implementation in Internet of Things (IoT) or edge applications. The streaming architecture underlying BNNs presented in the present disclosure employs various optimization techniques from a hardware and algorithm standpoint. The streaming architecture and unrolling mechanism enable high throughput, while the block RAM (BRAM)-less architecture and weight reuse method have the advantage of significantly reducing hardware resources and power consumption in the final routing implementation. In addition, the present disclosure presents an automated design generation flow for quickly implementing the optimal BNN model in an FPGA based on a user-defined BNN structure to achieve the goal of maximizing throughput and minimizing power consumption. The architecture for BNN presented in the present disclosure provides the optimal performance in terms of balancing throughput and power efficiency without sacrificing inference accuracy. Due to its small area and low latency, the design presented in the present disclosure is one of the best candidates for IoT or edge applications where low power consumption and real-time response are demanded.

Figure 25:
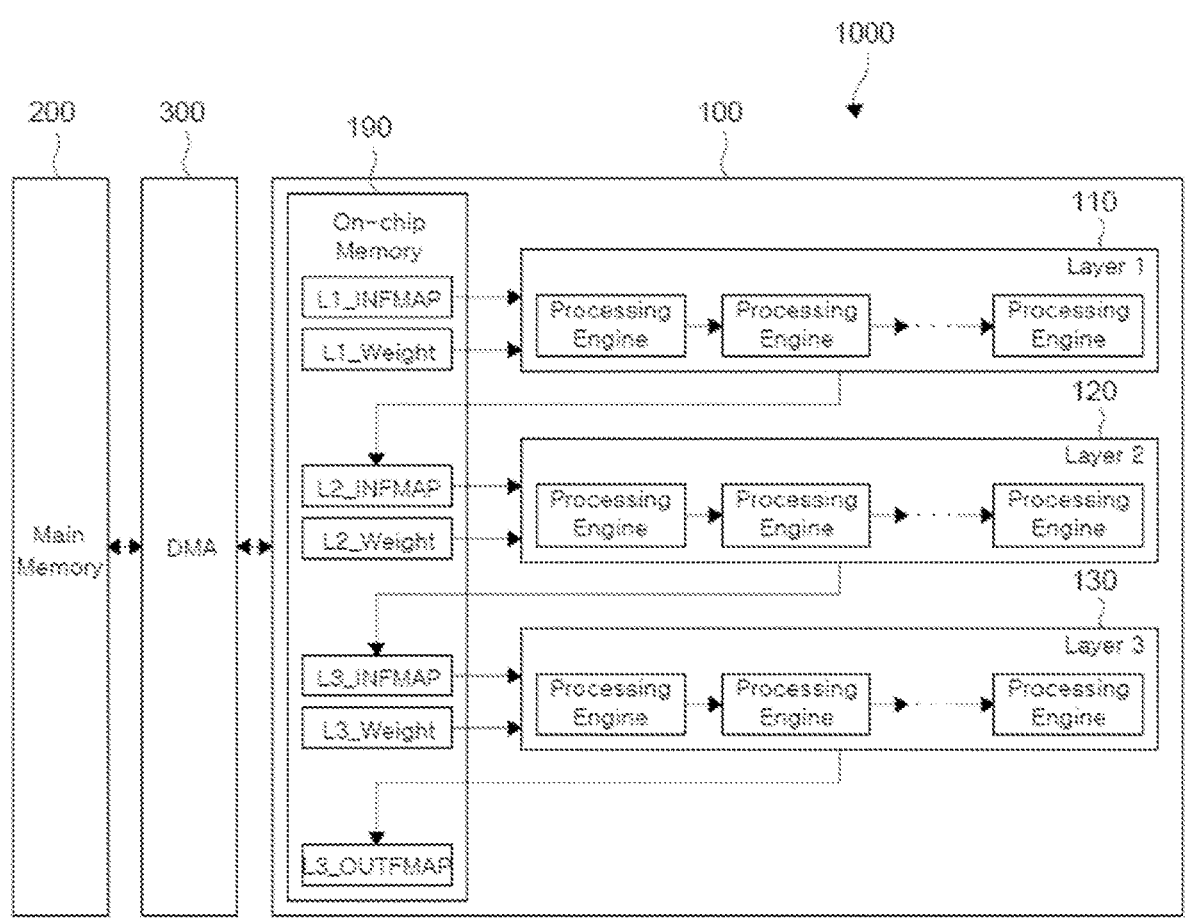
FIG. 25 is a schematic diagram illustrating an architecture according to an example of the present disclosure.

FIG. 25 is a schematic diagram illustrating an schematic architecture according to an example of the present disclosure.

Referring to FIG. 25, a schematic architecture 1000 may include a BNN dedicated accelerator (i.e., a BNN dedicated NPU) 100 and main memory (e.g., DDR memory) 200, and one or more Direct Memory Access (DMA) 300a and/or 300b.

The dedicated BNN accelerator (i.e., dedicated BNN NPU) 100 may include a first block 110 for a first layer, a second block 120 for a second layer, a third block 130 for a third layer, and an internal memory (i.e., on-chip memory) 190. Although not shown in FIG. 25, the dedicated BNN accelerator (i.e., BNN-only NPU) 100 may further include a third block 150 for the $i^{th}$ layer and a fourth block 170 for the $n^{th}$ layer as shown in FIG. 5. As such, the dedicated BNN accelerator (i.e., the BNN-only NPU) 100 according to an example of the present disclosure may include a dedicated block for each layer.

The internal memory (i.e., on-chip memory) 190 may include a first input feature map (shown as L1_INFMAP in FIG. 25) for a first layer and a first parameter (i.e., as the first weight, shown as L1_weight in FIG. 25) for the first layer. Also, the internal memory (i.e., on-chip memory) 190 may include a second input feature map (shown as L2_INFMAP in FIG. 25) for the second layer and a second parameter (i.e., as the second weight, shown as L2_weight in FIG. 25) for the second layer. The first parameter and the second parameter may be binarized values.

Each of the first block 100, the second block 120, and the third block 130 may include one or a plurality of processing engines. The one or more processing engines may be connected in a streaming form, that is, in a pipeline form. Specifically, the one or more processing engines may be connected to each other in a pipeline structure based on a compiled BNN structure.

One or more processing engines in each block may fetch input feature maps and parameters from the internal memory (i.e., on-chip memory) 190 and perform necessary operations. To this end, one or more processing engines in each block may include a line buffer capable of temporarily storing the input feature map and the parameters. As described above, the line buffer may be a first type of line buffer (i.e., CLB) or a second type of line buffer (i.e., PLB). The size of each line buffer may be set based on the size of the corresponding binarized feature map and the corresponding binarized weight.

The one or more processing engines may include an XNOR logic gate or a NOT logic gate, a circuit for pop-count operation, a circuit for batch normalization, a circuit for binarization, and a circuit for pooling. The circuit for the pop-count operation may further include a compressor (e.g., a 6:3 compression or a 3:2 compressor).

Meanwhile, the pop-count operation may be reused as described above.

As shown in FIG. 6, the batch-normalization circuit may perform batch-normalization based on a threshold value. The circuit for batch-normalization may select a NOT logic gate or an XNOR gate based on the binarized value.

The examples of the present disclosure disclosed in the present disclosure and the drawings merely provide a specific example for illustrative description and better understanding of the technical description of the present disclosure, but are not intended to limit the scope of the present disclosure. It will be apparent to those of ordinary skilled in the art to which the present disclosure pertains that other modified examples based on the technical spirit of the disclosure can be implemented in addition to the examples disclosed herein.

[National R&D Project Supporting this Invention]
  [Task Identification Number] 1711170668
  [Task Number] 2022-0-00248-001
  [Name of Ministry] Ministry of Science and ICT
  [Name of Project Management (Specialized) Institution] Institute of Information & Communications Technology Planning & Evaluation
  [Research Project Title] Development of Core Technology for PIM Artificial Intelligence Semiconductor (Design)
  [Research Task Title] Development of CXL-based PIM semiconductor technology for multiple DRAM modules considering memory consistency
  [Contribution Rate]1/1
  [Name of Organization Performing the Task] DeepX Co., Ltd.
  [Research period15 minutes] 2022 Apr. 1~2022 Dec. 31

What is claimed is:

1. A neural processing unit of a binarized neural network (BNN), the neural processing unit comprising:
  a plurality of circuits, wherein the plurality of circuits are connected in a form of pipeline and comprise a first circuitry comprising:
    a first sub-circuitry including a NOT logic gate and configured to perform a NOT logic gate operation by using a binarized feature map with a binarized weight,
    a second sub-circuitry including a pop-count performing unit and configured to perform an accumulation, and
    a third sub-circuitry configured to perform batch-normalization,
  wherein the first circuitry is configured to:
    determine whether the binarized weight is zero (0) or one (1),
    select the first sub-circuitry including the NOT logic gate to which an input value is inputted when the binarized weight is zero (0), and
    bypass the input value, thereby directly delivering the input value to the second sub-circuitry including the pop-count performing unit, when the binarized weight is one (1), and
  wherein the NOT logic gate of the first sub-circuitry removes or replaces a XNOR logic gate thereby reducing a size of the neural processing unit.

2. The neural processing unit of claim 1, wherein the first circuitry further comprises: a plurality of registers which are disposed between the first sub-circuitry, the second sub-circuitry and the third sub-circuitry.

3. The neural processing unit of claim 1, further comprising:
  a second circuitry configured to perform max-pooling on an output of the first circuitry.

4. The neural processing unit of claim 3, wherein the first circuitry corresponds to a first layer of the BNN, and the second circuitry corresponds to a second layer of the BNN.

5. The neural processing unit of claim 1, further comprising a line-buffer or a memory configured to store a binarized parameter corresponding to a layer of the BNN.

6. The neural processing unit of claim 5, wherein a size of the line-buffer is determined based on the size of a corresponding binarized feature map and the size of a corresponding binarized weight.

7. The neural processing unit of claim 1, wherein the third sub-circuitry is configured to perform the batch-normalization based on a pre-determined threshold value.

8. The neural processing unit of claim 1, wherein the first sub-circuitry further includes a K-mean cluster unit.

9. The neural processing unit of claim 1, wherein the second sub-circuitry further includes a compressor.

10. The neural processing unit of claim 1, wherein the second sub-circuitry further includes a pop-count reuse unit.

11. A neural processing unit of an artificial neural network (ANN) having a plurality of layers, the neural processing unit comprising:
  a plurality of circuits,
  wherein the plurality of circuits are connected in a form of pipeline,
  wherein the number of the plurality of circuits is identical to the number of the plurality of layers of the ANN,
  wherein, a first circuitry among the plurality of circuits includes:
    a first sub-circuitry including a NOT logic gate and configured to perform a NOT logic gate operation by using a binarized feature map with a binarized weight,
    a second sub-circuitry including a pop-count performing unit and configured to perform an accumulation, and
    a third sub-circuitry configured to perform batch-normalization,
  wherein the first circuitry is configured to:
    determine whether the binarized weight is zero (0) or one (1), select the first sub-circuitry including the NOT logic gate to which an input value is inputted when the binarized weight is zero (0), and bypass the input value, thereby directly delivering the input value to the second sub-circuitry including the pop-count performing unit, when the binarized weight is one (1), and wherein the NOT logic gate of the first sub-circuitry removes or replaces a XNOR logic gate thereby reducing a size of the neural processing unit.

12. The neural processing unit of claim 11,
wherein the first circuitry further comprises: a plurality of registers which are disposed between the first sub-circuitry, the second sub-circuitry and the third sub-circuitry.

13. The neural processing unit of claim 11, further comprising:
a second circuitry configured to perform max-pooling on an output of the first circuitry.

14. An electronic apparatus comprising:
a main memory; and
a neural processing unit (NPU) configured to perform a function of an artificial neural network (ANN) having a plurality of layers,
wherein the NPU includes a plurality of circuits,
wherein the plurality of blocks is circuits are connected in a form of pipeline,
wherein the number of the plurality of circuits is identical to the number of the plurality of layers of the ANN,
wherein a first circuitry among the plurality of circuits includes:

a first sub-circuitry including a NOT logic gate and configured to perform a NOT logic gate operation by using a binarized feature map with a binarized weight, a second sub-circuitry including a pop-count performing unit and configured to perform an accumulation, and a third sub-circuitry configured to perform batch-normalization, wherein the first circuitry is configured to:
determine whether the binarized weight is zero (0) or one (1), select the first sub-circuitry including the NOT logic gate to which an input value is inputted when the binarized weight is zero (0), and bypass the input value, thereby directly delivering the input value to the second sub-circuitry including the pop-count performing unit, when the binarized weight is one (1), and wherein the NOT logic gate of the first sub-circuitry removes or replaces a XNOR logic gate thereby reducing a size of the neural processing unit.

15. The electronic apparatus of claim 14,
wherein the first circuitry further comprises: a plurality of registers which are disposed between the first sub-circuitry, the second sub-circuitry and the third sub-circuitry.

16. The electronic apparatus of claim 14, further comprising:
a second circuitry configured to perform max-pooling on an output of the first circuitry.

* * * * *